United States Patent
Shaw

(10) Patent No.: US 9,655,034 B2
(45) Date of Patent: May 16, 2017

(54) TRANSACTION SENSITIVE ACCESS NETWORK DISCOVERY AND SELECTION

(71) Applicant: AT&T Intellectual Property I, L.P., Atlanta, GA (US)

(72) Inventor: Venson Shaw, Kirkland, WA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 156 days.

(21) Appl. No.: 14/530,593

(22) Filed: Oct. 31, 2014

(65) Prior Publication Data
US 2016/0127981 A1    May 5, 2016

(51) Int. Cl.
| H04W 48/16 | (2009.01) |
| H04L 29/08 | (2006.01) |
| H04L 29/06 | (2006.01) |
| H04W 8/18  | (2009.01) |
| H04W 48/18 | (2009.01) |

(52) U.S. Cl.
CPC ............ *H04W 48/16* (2013.01); *H04L 67/16* (2013.01); *H04L 67/22* (2013.01); *H04L 67/306* (2013.01); *H04L 65/10* (2013.01); *H04L 67/14* (2013.01); *H04W 8/18* (2013.01); *H04W 48/18* (2013.01)

(58) Field of Classification Search
CPC ..... H04W 48/16; H04W 76/023; H04W 8/18; H04W 48/18; H04L 67/16; H04L 67/22; H04L 67/306; H04L 67/14; H04L 65/10
See application file for complete search history.

(56) References Cited

U.S. PATENT DOCUMENTS

| 4,334,221 A | 6/1982 | Rosenhagen et al. |
| 4,829,565 A | 5/1989 | Goldberg |
| 5,404,516 A | 4/1995 | Georgiades et al. |
| 6,085,216 A | 7/2000 | Huberman et al. |
| 6,819,982 B2 | 11/2004 | Doane |

(Continued)

FOREIGN PATENT DOCUMENTS

| EP | 0167625 A1 | 1/1986 |
| EP | 0687626 A1 | 12/1995 |

(Continued)

OTHER PUBLICATIONS

Boddhu, et al. "A collaborative smartphone sensing platform for detecting and tracking hostile drones", Ground/Air Multisensor Interoperability, Integration, and Networking for Persistent ISR IV, Proc. of SPIE vol. 8742, 874211. May 22, 2013. 11 pages.

(Continued)

*Primary Examiner* — Brian O'Connor
(74) *Attorney, Agent, or Firm* — Amin, Turocy & Watson, LLP

(57) ABSTRACT

Transaction sensitive access network discovery and selection function (TSANDSF) features are disclosed. TSANDSF features can include access network resource (ANR) selection based on vendor ANR information and UE information. TSANDSF features can further include facilitating access, via a UE, to vendor value added products or service, vendor selected information, or vendor advertisements as a result of establishing a communication link with a vendor ANR. In contrast to conventional ANDSF, TSANDSF can facilitate improved ANR ranking and selection based on rules that correlate UE information with determined vendor ANR features.

20 Claims, 10 Drawing Sheets

(56) References Cited

U.S. PATENT DOCUMENTS

| | | | |
|---|---|---|---|
| 6,985,810 B2 | 1/2006 | Moitra et al. | |
| 7,117,067 B2 | 10/2006 | Mclurkin et al. | |
| 7,130,741 B2 | 10/2006 | Bodin et al. | |
| 7,149,611 B2 | 12/2006 | Beck et al. | |
| 7,236,858 B2 | 6/2007 | Carpenter et al. | |
| 7,252,265 B2 | 8/2007 | Perlo et al. | |
| 7,551,577 B2 | 6/2009 | Mcrae | |
| 7,583,632 B2 | 9/2009 | Janevski et al. | |
| 7,831,259 B2 | 11/2010 | Cao et al. | |
| 7,844,364 B2 | 11/2010 | Mclurkin et al. | |
| 8,045,980 B2* | 10/2011 | Buckley | H04W 48/18 370/328 |
| 8,059,631 B2 | 11/2011 | Anto | |
| 8,060,270 B2 | 11/2011 | Vian et al. | |
| 8,160,606 B2 | 4/2012 | Shrivathsan et al. | |
| 8,238,935 B2 | 8/2012 | Chen et al. | |
| 8,255,470 B2 | 8/2012 | Jackson et al. | |
| 8,260,485 B1 | 9/2012 | Meuth et al. | |
| 8,275,352 B2 | 9/2012 | Forstall et al. | |
| 8,315,800 B2 | 11/2012 | Sanchez et al. | |
| 8,369,867 B2 | 2/2013 | Van Os et al. | |
| 8,439,301 B1 | 5/2013 | Lussier et al. | |
| 8,442,005 B2 | 5/2013 | Dutta et al. | |
| 8,442,483 B2 | 5/2013 | Gunasekara | |
| 8,521,328 B2 | 8/2013 | Jang | |
| 8,559,925 B2 | 10/2013 | Zhang | |
| 8,565,176 B2 | 10/2013 | Norlen et al. | |
| 8,565,780 B2 | 10/2013 | Soelberg et al. | |
| 8,649,774 B1 | 2/2014 | Zheng et al. | |
| 8,665,089 B2 | 3/2014 | Saigh et al. | |
| 8,676,406 B2 | 3/2014 | Coffman et al. | |
| 8,768,555 B2 | 7/2014 | Duggan et al. | |
| 8,787,318 B2 | 7/2014 | Pampu et al. | |
| 8,788,121 B2 | 7/2014 | Klinger | |
| 8,799,476 B2 | 8/2014 | Karaoguz et al. | |
| 8,817,707 B2* | 8/2014 | Gupta | H04W 36/34 370/328 |
| 8,824,439 B2 | 9/2014 | Jiang et al. | |
| 8,827,206 B2 | 9/2014 | Van Speybroeck et al. | |
| 8,903,426 B2 | 12/2014 | Tholkes et al. | |
| 8,918,075 B2 | 12/2014 | Maier et al. | |
| 8,958,928 B2 | 2/2015 | Seydoux et al. | |
| 8,965,598 B2 | 2/2015 | Kruglick | |
| 9,258,761 B2* | 2/2016 | Bertrand | H04W 48/18 |
| 2004/0030571 A1 | 2/2004 | Solomon | |
| 2004/0073784 A1 | 4/2004 | Ishidoshiro | |
| 2005/0048918 A1 | 3/2005 | Frost et al. | |
| 2005/0105496 A1 | 5/2005 | Ambrosino | |
| 2006/0114324 A1 | 6/2006 | Farmer et al. | |
| 2007/0171818 A1 | 7/2007 | Shoji et al. | |
| 2007/0284474 A1 | 12/2007 | Olson et al. | |
| 2008/0135687 A1 | 6/2008 | Penzo | |
| 2008/0144884 A1 | 6/2008 | Habibi | |
| 2008/0194273 A1 | 8/2008 | Kansal et al. | |
| 2009/0156231 A1 | 6/2009 | Versteeg et al. | |
| 2009/0215469 A1 | 8/2009 | Fisher et al. | |
| 2009/0219393 A1 | 9/2009 | Vian et al. | |
| 2009/0248587 A1 | 10/2009 | Van Buskirk | |
| 2010/0240370 A1 | 9/2010 | Pandit et al. | |
| 2010/0250022 A1 | 9/2010 | Hines et al. | |
| 2011/0035284 A1 | 2/2011 | Moshfeghi | |
| 2011/0072101 A1 | 3/2011 | Forsell et al. | |
| 2011/0090870 A1 | 4/2011 | Ronneke et al. | |
| 2011/0176424 A1 | 7/2011 | Yang et al. | |
| 2011/0196912 A1 | 8/2011 | Payton et al. | |
| 2011/0301784 A1 | 12/2011 | Oakley et al. | |
| 2012/0004791 A1 | 1/2012 | Buelthoff et al. | |
| 2012/0029731 A1 | 2/2012 | Waldock et al. | |
| 2012/0058762 A1* | 3/2012 | Buckley | H04W 48/18 455/434 |
| 2013/0034019 A1 | 2/2013 | Mustajarvi | |
| 2013/0039353 A1 | 2/2013 | Franco et al. | |
| 2013/0070641 A1 | 3/2013 | Meier et al. | |
| 2013/0077482 A1 | 3/2013 | Krishna et al. | |
| 2013/0107702 A1* | 5/2013 | Gupta | H04L 12/287 370/230 |
| 2013/0128815 A1 | 5/2013 | Scherzer et al. | |
| 2013/0137423 A1* | 5/2013 | Das | H04W 12/08 455/426.1 |
| 2013/0155851 A1* | 6/2013 | Koodli | H04L 45/308 370/230 |
| 2013/0165120 A1 | 6/2013 | Nylander et al. | |
| 2013/0166103 A1 | 6/2013 | Ko | |
| 2013/0198817 A1 | 8/2013 | Haddad et al. | |
| 2013/0208693 A1 | 8/2013 | De La Forest Divonne et al. | |
| 2013/0210385 A1 | 8/2013 | Ahmed et al. | |
| 2013/0214925 A1 | 8/2013 | Weiss | |
| 2013/0225161 A1 | 8/2013 | Chhabra et al. | |
| 2013/0259020 A1 | 10/2013 | Ullah et al. | |
| 2013/0304257 A1 | 11/2013 | Wang et al. | |
| 2013/0308622 A1 | 11/2013 | Uhlik | |
| 2013/0333016 A1 | 12/2013 | Coughlin et al. | |
| 2013/0340013 A1 | 12/2013 | Chadha | |
| 2014/0004854 A1 | 1/2014 | Veran et al. | |
| 2014/0018976 A1 | 1/2014 | Goossen | |
| 2014/0023059 A1 | 1/2014 | Gupta | |
| 2014/0025233 A1 | 1/2014 | Levien et al. | |
| 2014/0032034 A1 | 1/2014 | Raptopoulos et al. | |
| 2014/0081479 A1 | 3/2014 | Vian et al. | |
| 2014/0092886 A1 | 4/2014 | Gupta | |
| 2014/0106743 A1 | 4/2014 | Ferraro Esparza et al. | |
| 2014/0126360 A1 | 5/2014 | Rong et al. | |
| 2014/0126532 A1 | 5/2014 | Bapat et al. | |
| 2014/0140575 A1 | 5/2014 | Wolf | |
| 2014/0187252 A1 | 7/2014 | Gupta et al. | |
| 2014/0192643 A1 | 7/2014 | Kalapatapu et al. | |
| 2014/0200749 A1 | 7/2014 | Spilsbury | |
| 2014/0206349 A1 | 7/2014 | Bertrand et al. | |
| 2014/0206353 A1 | 7/2014 | Kim et al. | |
| 2014/0241333 A1 | 8/2014 | Kim et al. | |
| 2014/0269654 A1* | 9/2014 | Canpolat | H04W 48/20 370/338 |
| 2014/0312165 A1 | 10/2014 | Mkrtchyan | |
| 2014/0341076 A1 | 11/2014 | Orlandi et al. | |
| 2014/0378162 A1 | 12/2014 | Shatsky et al. | |
| 2015/0011241 A1 | 1/2015 | Papakipos et al. | |
| 2015/0017943 A1 | 1/2015 | Mitchell et al. | |
| 2015/0065164 A1 | 3/2015 | Hoseinitabatabaei et al. | |
| 2015/0066248 A1 | 3/2015 | Arbeit et al. | |
| 2015/0101503 A1 | 4/2015 | Brown | |
| 2015/0120094 A1 | 4/2015 | Kimchi et al. | |
| 2015/0195759 A1 | 7/2015 | Sirotkin et al. | |
| 2015/0195858 A1 | 7/2015 | Jin et al. | |
| 2015/0223115 A1 | 8/2015 | Liang et al. | |
| 2015/0236778 A1 | 8/2015 | Jalali | |
| 2015/0282058 A1 | 10/2015 | Forssell | |
| 2015/0288797 A1 | 10/2015 | Vincent | |
| 2015/0304885 A1 | 10/2015 | Jalali | |
| 2015/0312808 A1 | 10/2015 | Kiss | |
| 2015/0319102 A1* | 11/2015 | Esdaile | H04L 67/22 709/225 |
| 2015/0327067 A1* | 11/2015 | Shen | G06Q 30/02 713/170 |
| 2015/0327136 A1 | 11/2015 | Kim et al. | |
| 2015/0365351 A1 | 12/2015 | Suit | |
| 2015/0373579 A1* | 12/2015 | Xu | H04W 28/0289 370/230 |
| 2016/0035224 A1 | 2/2016 | Yang et al. | |
| 2016/0050012 A1 | 2/2016 | Frolov et al. | |
| 2016/0307449 A1 | 10/2016 | Gordon et al. | |

FOREIGN PATENT DOCUMENTS

| | | |
|---|---|---|
| EP | 2706790 A1 | 3/2014 |
| GB | 2231220 A | 11/1990 |
| GB | 2473825 A | 3/2011 |
| WO | 2010064548 A1 | 6/2010 |
| WO | 2013039573 A2 | 3/2013 |

(56) References Cited

FOREIGN PATENT DOCUMENTS

| WO | 2013134669 A1 | 9/2013 |
|---|---|---|
| WO | 2013163746 | 11/2013 |

OTHER PUBLICATIONS

Quaritsch, et al., "Collaborative Microdrones: Applications and Research Challenges", Autonomics 2008, Sep. 23-25, 2008, Turin, Italy. 7 pages.
Nova, et al., "The impacts of awareness tools on mutual modelling in a collaborative video-game", Groupware: Design, Implementation, and Use. vol. 2806 of the series Lecture Notes in Computer Science. Springer Berlin Heidelberg, 2003. 13 pages.
Choi, et al., "Collaborative Tracking Control of UAV-UGV", World Academy of Science, Engineering and Technology, International Scholarly and Scientific Research & Innovation, vol. 6, No. 11, 2012. 4 pages.
Zhao, Yilin. "Standardization of mobile phone positioning for 3G systems" IEEE Communications Magazine, Jul. 2002, 9 pages.
Paredes, et al. "SOSPhone: a mobile application for emergency calls", Universal Access in the Information Society Aug. 2014, vol. 13, Issue 3, 14 pages.
D'Roza, et al, "An Overview of Location-Based Services", BT Technology Journal, Jan. 2003, vol. 21, Issue 1, 8 pages.
Arminen, Ilkka. "Social functions of location in mobile telephony", Personal and Ubiquitous Computing, Aug. 2006, 5 pages.
Joseph, et al., "Interoperability of WiFi Hotspots and Cellular Networks", Proceedings of the 2nd ACM International Workshop on Wireless mobile applications and services in WLAN hotspots, Oct. 2004, 10 pages.
Li, et al., "Context-Aware Handoff on Smartphones", 2013 IEEE 10th International Conference on Mobile Ad-Hoc and Sensor Systems, Oct. 2013, 9 pages.
Tawil, et al., "Distributed Handoff Decision Scheme using MIH Function for the Fourth Generation Wireless Networks", 2008 3rd International Conference on Information and Communication Technologies: From Theory to Applications, Apr. 2008, 6 pages.
Taleb, et al., "On the Design of Energy-Aware 3G/WiFi Heterogeneous Networks under Realistic Conditions," 2013 27th International Conference on Advanced Information Networking and Applications Workshops, Mar. 2013, 5 pages.
Lee, et al, "Economics of WiFi offloading: Trading delay for cellular capacity", IEEE Transactions on Wireless Communications, vol. 13, No. 3, Mar. 2014, 15 pages.
Kotwal, et al. "Seamless Handoff between IEEE 802.11 and GPRS Networks", Distributed Computing and Internet Technology—Lecture Notes in Computer Science, Proceedings of the 6th International Conference, ICDCIT 2010, Feb. 2010, 7 pages.
Pyattaev, et al, "3GPP LTE traffic offloading onto WiFi Direct", IEEE Wireless Communications and Networking Conference Workshops, Apr. 2013, 6 pages.
Yang, et al, "A Performance Evaluation of Cellular/WLAN Integrated Networks," Fourth International Symposium on Parallel Architectures, Algorithms and Programming, Dec. 2011, 5 pages.
Bennis, et al, "When cellular meets WiFi in wireless small cell networks," IEEE Communications Magazine, Jun. 2013, vol. 51, Issue 6, 7 pages.
Melzer, et al, "Securing WLAN offload of cellular networks using subscriber residential access gateways," IEEE International Conference on Consumer Electronics, Jan. 2011, 2 pages.
Non-Final Office Action for U.S. Appl. No. 14/732,631 dated Apr. 28, 2016, 35 pages.
Non-Final Office Action for U.S. Appl. No. 14/549,119, mailed Jul. 14, 2016, 21 pages.
Morgenthaler, Simon, et al. "UAVNet: A mobile wireless mesh network using unmanned aerial vehicles." 2012 IEEE Globecom Workshops. IEEE, 2012. Retrieved on Aug. 26, 2016. 6 pages.
Di Felice, Marco, et al. "Self-organizing aerial mesh networks for emergency communication." 2014 IEEE 25th Annual International Symposium on Personal, Indoor, and Mobile Radio Communication (PIMRC). IEEE, 2014. Retrieved on Aug. 26, 2016. 6 pages.
Office Action dated Sep. 21, 2016 for U.S. Appl. No. 14/732,631, 40 pages.
Office Action dated Feb. 3, 2017 for U.S. Appl. No. 14/732,626, 125 pages.

\* cited by examiner

TRANSACTION SENSITIVE ACCESS NETWORK DISCOVERY AND SELECTION

TECHNICAL FIELD

The disclosed subject matter relates to access network discovery and selection, including transaction sensitive access network discovery and selection.

BACKGROUND

By way of brief background, access network discovery and selection function (ANDSF) techniques aid user equipment (UE) to discover non-cellular access networks. These access networks can include Wi-Fi, WiMax, etc. Conventional ANDSF technology can provide network selection rules and a list of access networks to a UE. This information can typically be provided by either a push or pull method, e.g., the information can be pushed to UEs without a request for the information, or can be pulled to the UE in response to a request by the UE. Numerous implementations of ANDSF functionality have been implemented. Typically, these implementations employ servers located in the core network of a cellular service provider, e.g., ANDSF functionality can be included in a home location register (HLR), etc.

DETAILED DESCRIPTION

Figure 1:
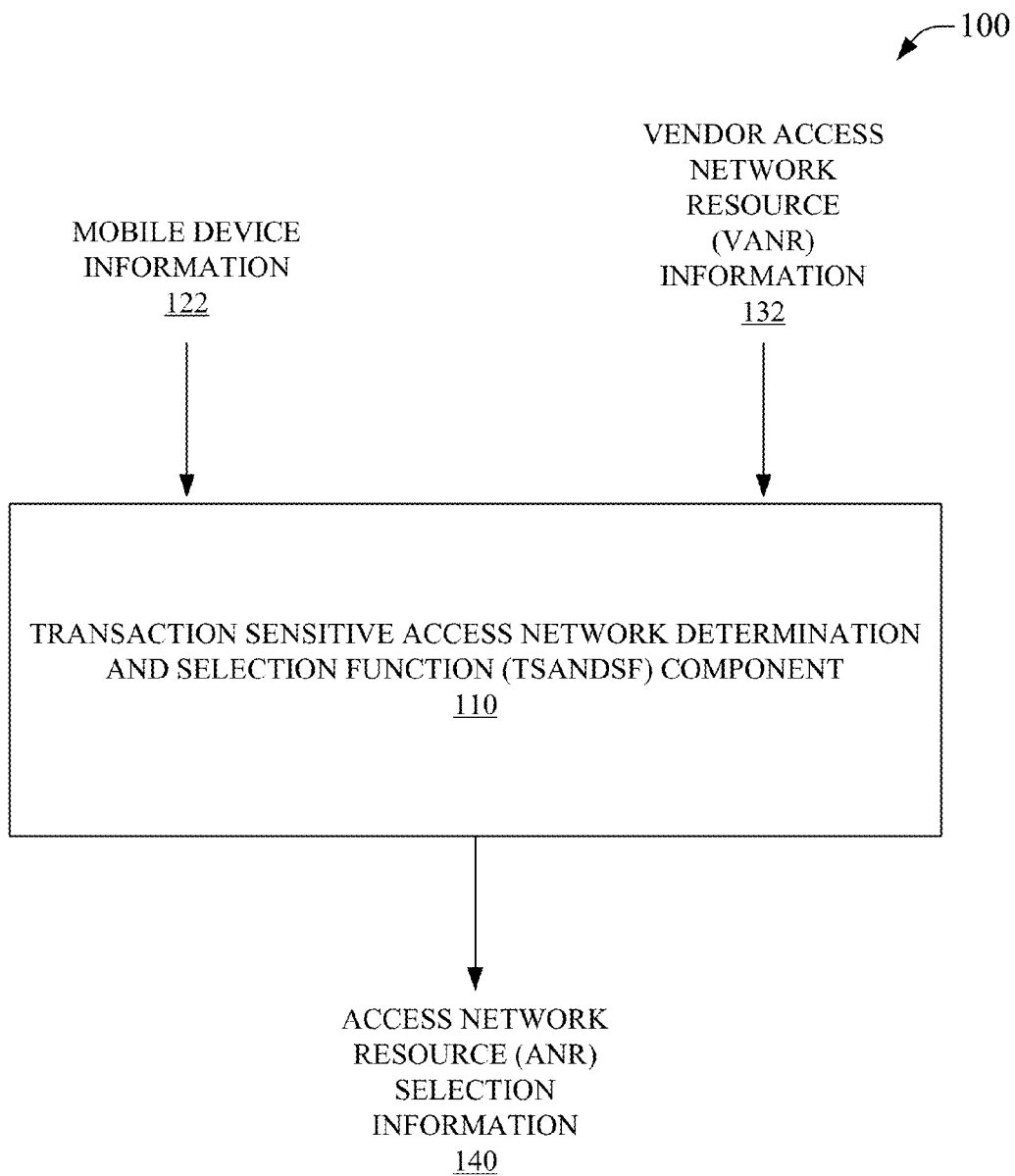
FIG. 1 is an illustration of a system that facilitates determining transaction sensitive ANDSF information in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

An access network discovery and selection function (ANDSF) can aid user equipment (UE) to discover non-cellular access networks. These access networks can include Wi-Fi, WiMax, etc. Conventional ANDSF technology can push or pull network selection rules and a list of access networks to a UE. Typically, ANDSF implementations employ servers located in a core network of a cellular service provider, such as at an HLR, etc. Conventional ANDSF functionality can be ignorant of value added benefits associated with selection of an access network resource (ANR) associated with a particular vendor. As a non-limiting example, a coffee vendor can provide access to a higher speed Wi-Fi access point based on a customer loyalty account. Conventional ANDSF technology can be ignorant of ANRs associated with the example coffee vendor and can also be unable to select the example higher speed Wi-Fi access point based on determining the customer's UE is associated with the customer loyalty account. In contrast, the presently disclosed subject matter can receive mobile device information that can aid in identifying participation in the example customer loyalty program, identifying the presence of the coffee vendor ANRs, including the example higher speed Wi-Fi access point, and can aid in selection of the higher speed Wi-Fi access point based, for example, on a determination that this ANR satisfies a rule related to ranked ANRs proximate to the UE.

Transaction sensitive ANDSF technology, as disclosed, can be an improvement to conventional ANDSF technology by providing for improved ANR detection, for example, by receiving updated ANR information from vendor-side components. Transaction sensitive ANDSF technology can also be an improvement to conventional ANDSF technology by providing for improved ANR selection, for example, by determining selection based on value added features, user preferences related to vendor ANRs, fitness of a vendor ANR to the state of a UE, and other aspects not considered in conventional ANDSF technologies. Moreover, determination of ANR selection information can be performed more quickly because selection criteria related to vendors, and transaction therewith, can result in reduced set sizes employed in the determination of the ANR selection information. As an example, where a UE is executing an electronic banking function, a subset of ANRs can be employed in determining ANR selection information, wherein the subset comprises a Wi-Fi access point via a national banking chain location having a high level of data encryption as a value added feature. In this example, the value added feature can facilitate an ANR sort to exclude many other ANRs that do not offer the high level of data encryption value added feature, resulting in a smaller subset of ANRs for ranking. This can improve processing times for ranking and returning a list of ranked ANRs to the UE as part of ANR selection information. In contrast, conventional ANDSF systems may not facilitate sorting ANRs in view of vendor ANR information to determine a subset and, as such, can result in longer processes to determine selection information to return to the UE.

Certain embodiments of the present disclosure provide for transaction sensitive ANDSF technology employing current UE device states in determining ANR selection information. Current UE device states can include information about the hardware and software environments of the UE. This current information can reflect a resource need or resource preference that can be provided by an ANR, and selection of an appropriate ANR can be facilitated by analyzing resources associated with equipment of different vendors. As an example, where a UE is associated with a user currently searching restaurant reviews, food vendor ANRs can have increased ranks. An increased rank in the example food vendor ANRs can be associated with discounts on purchases with the vendor for UEs that link with the vendor's ANR, targeted advertising being included via UEs that link with the vendor's ANR, access to vendor information, such as, menus, reviews, etc., via a UE that links with the vendor's ANR, etc.

In some embodiments of the present disclosure, transaction sensitive ANDSF technology, can employ historical UE device states in determining ANR selection information. Historical UE device states can include information about the historical hardware and historical software environments of the UE. This historical information can reflect a resource need or resource preference that can be sourced by an ANR, and selection of an appropriate ANR can be facilitated by analyzing resources associated with devices of different vendors. As an example, where a UE is associated with a historical frequent use of low latency ANRs, vendor ANRs can have an increased rank where they are associated with low latency. An increase in the example vendor ANR rank can be associated with historical information related to low latency levels on that vendor's ANR. As an example, an ANR associated with a branded cable internet backbone can indicate low latency levels in comparison to an ANR associated with a gas station that doesn't indicate any information about latency levels. This can steer the UE towards establishing a link to the branded cable internet backbone ANR. Moreover, where the UE links with said ANR, customer interaction can be provided via the UE from the vendor to a user of the UE, such as, advertising, discounts, data collection, surveys, loyalty programs, news, weather information, traffic information, etc.

Some embodiments of the present disclosure provide transaction sensitive ANDSF technology that can employ predicted UE device states, e.g., inferences on likely future UE states, in determining ANR selection information. Predicted UE device states can include information about likely future hardware and likely future software environments of the UE. This inference information can reflect a resource need or resource preference that can be satisfied by an ANR, and selection of an appropriate ANR can be facilitated by analyzing resources associated with ANR devices of different vendors. As an example, where a UE is associated with an inference of a depleted battery, vendor ANRs can have an increased rank where they are associated with an available power source. An increase in the example vendor ANR rank can be associated with predictive information related to a way to recharge a battery based on the inference that the battery will be discharged below a determined level. As an example, an ANR associated with a charging station in an airport can be higher ranked than an ANR not associated with a charging station in the same airport. The inference of depleted battery conditions for the UE can be employed to suggest that the UE establish a link to the charging station ANR. Moreover, where the UE links with said charging station ANR, the vendor can provide notice via the UE that power is available for recharging. In contrast, where an example UE is associated with a future state having a nearly full battery, the ANR selection information can steer then to the example ANR not associated with a charging station and hence, information about available power may not be provided via the UE. This can result in selectively providing charging station information to UEs that are more likely to need recharging and can result in fewer UEs that are not in need of charging occupying charging stations, which can be particularly beneficial to users in areas where charging stations can be a sparse resource.

Certain embodiments of the present disclosure provide transaction sensitive ANDSF technology that can employ event information, e.g., sporting event information, sale even information, traffic event information, weather event information, etc., in determining ANR selection information. UE device information or vendor information can include event information. This event information can reflect a resource need or resource preference that can be satisfied by an ANR, and selection of an appropriate ANR can be facilitated by analyzing resources associated with ANR devices of different vendors. As an example, where event information comprises traffic accident information, vendor ANRs can have an increased rank where they provide added value that can mitigate the effects of the traffic accident. An increase in the example vendor ANR rank can be associated with providing an added value, such as a meal discount, being located closer to a traffic incident, etc., when the traffic accident information satisfies a rule. As an example, an ANR associated with a roadside restaurant near the accident can be higher ranked than an ANR associated with a restaurant located farther from the accident. The event information can be employed to suggest that the UE establish a link to an ANR to capture the added value. Where the user of the UE may prefer to sit in a restaurant to wait out a traffic jam caused by the example traffic accident, linking to the ANR of the example restaurant can allow the vendor to notify the user, vie the UE, of the example discount associated with the traffic accident event information. As another example, ANRs associated with a hotel chain can be higher ranked as a result of a severe weather event, a tavern ANR can be higher ranked as a result of a sporting event, ANRs associated with a government agency can be ranked higher as a result of a natural disaster event such as flooding, fire, earthquake, etc., allowing these vendors to interact with UEs that select the corresponding ANR. This can allow for dissemination of advertising, news, emergency information, amber alerts, etc.

Transaction sensitive ANDSF components can comprise a ranking component or sorting component that can operate on a set of ANRs. Sorting or ranking of ANRs can be beneficial to a network provider by placing an ANR in a position that satisfies the needs of a UE with less waste. As an example, where three ANRs, having a 128 kbs, a 512 kbs, and a 5 mbps channel correspondingly available to a UE that is streaming music at 256 kbs, the ANRs can be ranked 512 kbps, 5 mbps, 128 kbps. This can indicate that use of the 512 kbps is preferable so as not to occupy the 5 mbps channel in an underutilized manner, and to try to avoid the 128 kbps channel which could cause the UE to change streaming rates to continue to stream music over the lower rate channel. In an aspect, the sorting or ranking can also employ mobile device information or vendor access network resource information. As an example, device information can comprise a user preference for channels with rates of 256 kbps or lower for music streaming processes, which information can be employed in ranking the three ANRs of the prior example as 128 kbps, 512 kbps, 5 mbps, to conform with the example user preference and example carrier efficiency goals. As another example, vendor access network resource information can comprise value added content for channels with rates of 256 kbps or lower, which information can be employed in ranking the three ANRs of the prior example as 128 kbps, 512 kbps, 5 mbps, to conform with the example mobile device information and example vendor access network resource information.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates determining transaction sensitive ANDSF information in accordance with aspects of the subject disclosure. System 100 can include transaction sensitive ANDSF (TSANDSF) component 110. TSANDSF component 110 can receive device mobile information 122. Mobile device information 122 can comprise device hardware environment information or device software environment information related to a UE, a user or user profile associated with the UE, information about processes of the UE, or other information related to the UE or user. TSANDSF component 110 can receive vendor access network resource (VANR) information 132. VANR information 132 can comprise vendor value added information or vendor access network resource (ANR) parameter information related to an access network resource, related to a vendor service or product related thereto, account information related to an a UE or user profile, etc. Some embodiments can also receive ANDSF information from core network components, etc., not illustrated, see FIG. 2, FIG. 3, etc.

TSANDSF component 110 can facilitate determining ANR selection information 140. ANR selection information 140 can comprise information related to an ANR or a set of ANRs. The information can relate to ordered, filtered, or sorted ANRs, and reflect a suggested or prioritized ANR in accord with TSANDSF functionality. ANR selection information 140 can be based on VANR information 132, which can comprise current or historical vendor ANR information, such as, ANR network congestion, available ANRs, billing agreements for ANRs with a network provider, vendor-centric selection rules, etc. ANR selection information 140 can also be based on mobile device information 122, which can comprise an identifier, location information, motion information, time information, predicted location information, schedule information, an encryption key, financial information, billing information, information related to a process in execution on the UE, QoE or QoS information, service tier information, user preferences, security information, privacy information, device hardware information, device software information, a behavior model, access network resource information, etc. As an example, ANR selection information 140 can identify a local femtocell based on VANR information 132 comprising information indicating low vendor network congestion, availability of the femtocell at the device location, available femtocell resources, and a service associated with the femtocell, and mobile device information 122 comprising information indicating that a mobile device has a key allowing access to the femtocell, the level of service of the mobile device is acceptable in view of the available femtocell resources, and motion data for the UE indicating a low likelihood of moving out of range of the femtocell. The example femtocell can be associated with a ranking or ordering that can relate to a selection order of the ANR, e.g., example femtocell. Example ANR selection information 140 can further comprise ANR information for other ANRs. These can also be ranked or sorted to reflect a preferred selection order relative to the ranked or ordered example femtocell in view of the mobile device information, e.g., mobile device information 122, and the VANR information, e.g., VANR information 132.

TSANDSF component 110 can further rank or order vendor ANRs against ANDSF information, such as ANDSF information received from a core network component associated with a cellular service provider core network. As such, TSANDSF component 110 can extend functionality associated with conventional ANDSF technology. In an embodiment, TSANDSF component can function in parallel with conventional ANDSF components to provide increased functionality for a UE proximate to an ANR associated with VANR information. As such, in some embodiments, a conventional ANDSF component can provide selection information that is ignorant of VANR information 132 to some UEs and TSANDSF component 110 can contemporaneously provide ANR selection information 140 to a UE that can be based on VANR information 132 and further based on conventional ANDSF information. As an example, a first UE can receive ANR selection information 140 via TSANDSF component 110 that considers conventional ANDSF information and VANR information 132 while a second UE can receive conventional ANDSF information from a conventional ANDSF component without the benefit of analyzing VANR information 132 via TSANDSF component 110.

Mobile device information 132 can comprise, in certain embodiments, current UE device states to enable determining ANR selection information 140. Current UE device states can include information about the current hardware and current software environments of the UE. This current information can reflect a resource need or resource preference sought from an prospective ANR, and selection of an appropriate ANR can be facilitated by analyzing resources associated with equipment of different vendors. As an example, where a UE is associated with a user currently streaming high definition video content, high bandwidth vendor ANRs can have increased rankings. An increased rank in the example vendor ANRs can be associated with providing priority access to the high bandwidth ANR based on an identifier related to a need for a high bandwidth connection from a UE. Where a link with a high bandwidth requesting UE is made to the vendor ANR, the vendor can additionally source information to a user via the UE, such as, discounts on purchases with the vendor, advertising, access to vendor information, etc.

In some embodiments, transaction sensitive ANDSF technology, can employ historical UE device states, e.g., as part or mobile device information 132, in determining ANR selection information. Historical UE device states can include information about the historical hardware and historical software environments of the UE. This historical information can reflect a resource need or resource preference that can be met by an ANR, and selection of an appropriate ANR can be facilitated by analyzing resources associated with ANR devices of different vendors. As an example, where a UE is associated with a historical frequent use of low latency ANRs, vendor ANRs can have an increased rank where they are associated with low latency. An increase in the example vendor ANR rank can be associated with historical information related to low latency levels on that vendor's ANR.

Some embodiments of mobile device information 132 can comprise predicted UE device states, e.g., inferences on likely future UE states, in determining ANR selection information. Predicted UE device states can include information about likely future hardware and likely future software environment characteristics of a UE. This inference information can reflect a resource need or resource preference that can be satisfied by an ANR, and selection of an appropriate ANR can be facilitated by analyzing resources associated with ANR devices of different vendors. As an example, where a UE is associated with an inference of a depleted battery, vendor ANRs can have an increased rank where they are associated with an available power source as a value added feature. An increase in the example vendor ANR rank can be associated with predictive information related to a way to recharge a battery based on the inference that the battery will be depleted at a future time. As an example, an ANR associated with a charging station in an airport can be higher ranked than an ANR not associated with a charging station in the same airport. The inference of depleted battery conditions for the UE can be employed to suggest that the UE establish a link to the charging station ANR. Moreover, where the UE links with said charging station ANR, the vendor can provide notice via the UE that power is available for recharging. In contrast, where an example UE is associated with a future state having a nearly full battery, the ANR selection information can steer then to the example ANR not associated with a charging station and hence, information about available power may not be provided via the UE. This can result in selectively providing charging station information to UEs that are more likely to need recharging and can result in fewer UEs that are not in need of charging occupying charging stations, which can be particularly beneficial to users in areas where charging stations can be a sparse resource.

Certain embodiments of the present disclosure provide transaction sensitive ANDSF technology that can employ event information, e.g., sporting event information, sale even information, traffic event information, weather event information, etc., in determining ANR selection information. UE device information or vendor information can include event information. This event information can reflect a resource need or resource preference that can be satisfied by an ANR, and selection of an appropriate ANR can be facilitated by analyzing resources associated with ANR devices of different vendors. As an example, where event information comprises traffic accident information, vendor ANRs can have an increased rank where they provide added value that can mitigate the effects of the traffic accident. An increase in the example vendor ANR rank can be associated with providing an added value, such as a meal discount, being located closer to a traffic incident, etc., when the traffic accident information satisfies a rule. As an example, an ANR associated with a roadside restaurant near the accident can be higher ranked than an ANR associated with a restaurant located farther from the accident. The event information can be employed to suggest that the UE establish a link to an ANR to capture the added value. Where the user of the UE may prefer to sit in a restaurant to wait out a traffic jam caused by the example traffic accident, linking to the ANR of the example restaurant can allow the vendor to notify the user, vie the UE, of the example discount associated with the traffic accident event information. As another example, ANRs associated with a hotel chain can be higher ranked as a result of a severe weather event, a tavern ANR can be higher ranked as a result of a sporting event, ANRs associated with a government agency can be ranked higher as a result of a natural disaster event such as flooding, fire, earthquake, etc., allowing these vendors to interact with UEs that select the corresponding ANR. This can allow for dissemination of advertising, news, emergency information, amber alerts, etc.

Figure 2:
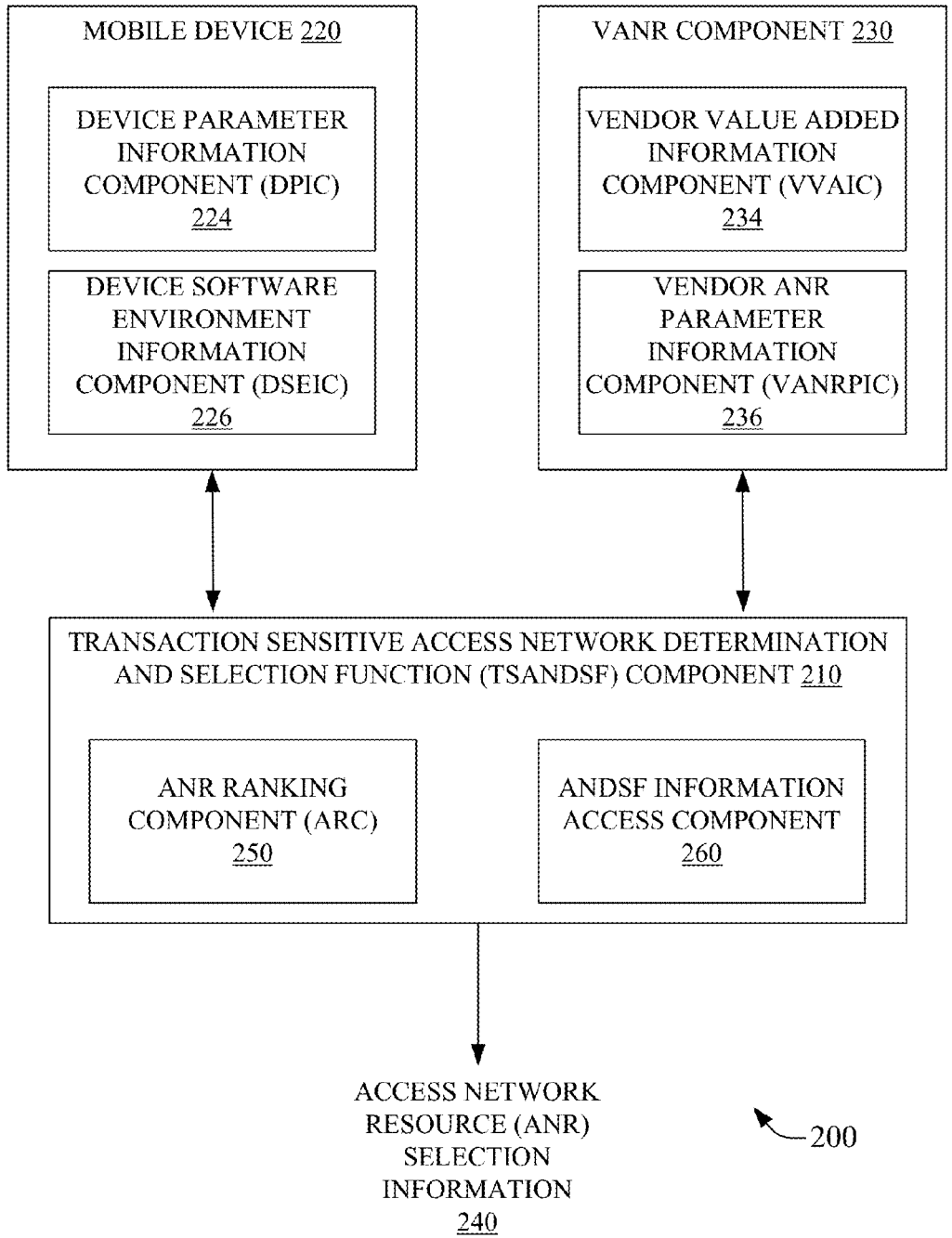
FIG. 2 is a depiction of a system that facilitates determining transaction sensitive ANDSF information based on information received via a vendor access network resource component in accordance with aspects of the subject disclosure.

FIG. 2 is a depiction of a system 200 that can facilitate determining transaction sensitive ANDSF information based on information received via a vendor access network resource component in accordance with aspects of the subject disclosure. System 200 can include transaction sensitive ANDSF (TSANDSF) component 210. TSANDSF component 210 can be coupled to mobile device 220. Mobile device 220 can be a user equipment, such as, a smartphone, a cellphone, a tablet computer, a wearable device, a laptop computer, etc. Mobile device can receive ANR selection information 240 to enable selection of an ANR based on TSANDSF analysis. Information related to the mobile device 220 can comprise device hardware environment information or device software environment information related to a UE, a user or user profile associated with a UE, information about processes of a UE, or other information related to a UE or user.

Mobile device 220 can comprise device parameter information component (DPIC) 224. DPIC 224 can facilitate access to device parameter information. Device parameter information can comprise device hardware environment information. As such, device parameter information can comprise information related to processor speeds, memory characteristics, display parameters, accelerometer measurements, barometric measurements, temperature measurements, location, motion, user interface features, radio technologies of the device, battery levels and health, etc. In an aspect, DPIC 224 can facilitate access to nearly any information related to the physical state, environment, or feature of a UE to facilitate TSANDSF functionality in determining ANR selection information 240. As an example, DPIC 224 can facilitate access to temperature/weather information that can indicate cold windy weather based on UE sensor data. This example information can be employed by TSANDSF component 210 in conjunction with information from VANR component 230 to increase the rank of a vendor ANR associated with a warm room, hot drinks or food, warm clothing, etc. In contrast to a conventional ANDSF system that might merely suggest a nearby ANR without any consideration to value added vendor features, the example information can be leverage in by TSANDSF 210 to increase the ranks of vendor ANRs that also proved added value when selected.

In some embodiments, mobile device 220 can comprise device software environment information component (DSEIC) 226. DSEIC 226 can facilitate access to device software environment information. As such, DSEIC 226 can facilitate access to information that can comprise information related to processes in execution, active processes, inactive processes, stalled processes, connectivity requirements or preferences, memory access characteristics, user interface parameters, software versions, update status, etc. In an aspect, DSEIC 226 can facilitate access to nearly any information related to the software state, software environment, or software features of a UE to facilitate TSANDSF functionality in determining ANR selection information 240. As an example, DSEIC 226 can facilitate access to information indicating that a UE is running a beta-test version of an operating system having high burst transmission characteristics. This example information can be employed by TSANDSF component 210 in conjunction with information from VANR component 230 to increase the rank of a vendor ANR associated with an ANR optimized for the beta-test version of the OS adapted to accept the high burst data transmissions, etc. In contrast to a conventional ANDSF system that might merely suggest a nearby ANR without any consideration to value added vendor features, the example information can be leveraged by TSANDSF 210 to increase the rank of a vendor ANR that also provides added value when selected. In this example, selecting the designated ANR can allow the UE to operate more efficiently by enabling the high burst data transmission of the beta-test OS via the example vendor ANR.

TSANDSF component 210 can be coupled to vendor access network resource (VANR) component 230. VANR component 230 can facilitate access to vendor value added information via vendor value added information component (VVAIC) 234 or vendor ANR parameter information, via vendor ANR parameter information component (VANRPIC) 236. VANRPIC 236 can facilitate access to ANR parameter information, such as, radio technology information, ANR software characteristics or parameters, ANR utilization information, ANR connectivity information, etc. VANRPIC 236 can, in an aspect, enable access to information related to the environment of, operation of, or features of the vendor ANR.

VVAIC 234 can facilitate access to vendor value added information related to a vendor access network resource, a vendor service or product related thereto, account information related to an UE or user profile, etc. VVAIC 234 can enable access to information relating to additional benefits associated with selecting a vendor ANR. As such, VVAIC 234 can provide for access to information that, for example, a vendor ANR employs strong encryption, a vendor complies with high levels of privacy, a vendor offers free or discounted products to users of the vendor's ANR, that a vendor ANR guarantees a level of latency/bandwidth/jitter/ etc., that a vendor ANR employs a designated communications standard, that a vendor location associated with the vendor's ANR has services or products available, etc. As a non-limiting example, VVAIC 234 can allow access to information indicating that an internet café employs anonymous routing technology as a value added feature to provide anonymity to users who link their UEs to the internet café's ANR, which can distinguish the internet café from other vendors that may not provide anonymity via their ANRs.

TSANDSF component 210 can facilitate determining ANR selection information 240. ANR selection information 240 can comprise information related to an ANR or a set of ANRs. The information can relate to ordered, filtered, or sorted ANRs, and reflect a suggested or prioritized ANR in accord with TSANDSF functionality. ANR selection information 240 can be based on information received via VANR component 230, which can comprise current or historical information from VVAIC 234 or VANRPIC 236. ANR selection information 240 can also be based on current or historical information related to mobile device 220, e.g., access via DPIC 224 or DSEIC 226.

DPIC 224 or DSEIC 226 can enable access to mobile device information that can comprise, in certain embodiments, current UE device states to enable determining ANR selection information 240. Current UE device states can include information about the current hardware and current software environments of the UE. This current information can reflect a resource need or resource preference sought from a prospective ANR, and selection of an appropriate ANR can be facilitated by analyzing resources associated with equipment of different vendors.

In some embodiments, DPIC 224 or DSEIC 226 can enable access to historical UE device states as part of determining ANR selection information. Historical UE device states can include information about the historical hardware and historical software environments of the UE. This historical information can reflect a resource need or resource preference that can be met by an ANR, and selection of an appropriate ANR can be facilitated by analyzing resources associated with ANR devices of different vendors.

Some embodiments of DPIC 224 or DSEIC 226 can facilitate access to predicted UE device states, such as, inferences relating to likely future UE states, in conjunction with determining ANR selection information. Predicted UE device states can include information about likely future hardware and likely future software environment characteristics of a UE. This inference information can reflect a predicted resource need or resource preference that can be satisfied by an ANR, and selection of an appropriate ANR can be facilitated by analyzing resources associated with ANR devices of different vendors.

Certain embodiments of the present disclosure provide for DPIC 224, DSEIC 226, or VVAIC 234, that can enable access to event information to facilitate determining ANR selection information. As such, UE device information or vendor information can comprise event information. This event information can reflect a resource need or resource preference that can be satisfied by an ANR, and selection of an appropriate ANR can be facilitated by analyzing resources associated with ANR devices of different vendors. Event information can be employed to suggest that the UE establish a link to an ANR to capture added value corresponding to an event via a vendor or vendor ANR.

TSANDSF component 210 can further rank or order vendor ANRs, conventional ANDSF information, or a combination thereof. As such, TSANDSF component 210 can comprise ANR ranking component (ARC) 250. ARC 250 can analyze information received from mobile device 220 or VANR component 230 to rank a vendor ANR. Moreover, in some embodiments, ANDSF information access component 260 can enable access to conventional ANDSF information, e.g., from a conventional ANDSF component located elsewhere. Where conventional ANDSF information is received, ARC component 250 can also facilitate ranking this information. As sated herein, ranking ANRs associated with conventional ANDSF information can be separate from, in parallel with, or in conjunction with ranking of a vendor ANR.

Figure 3:
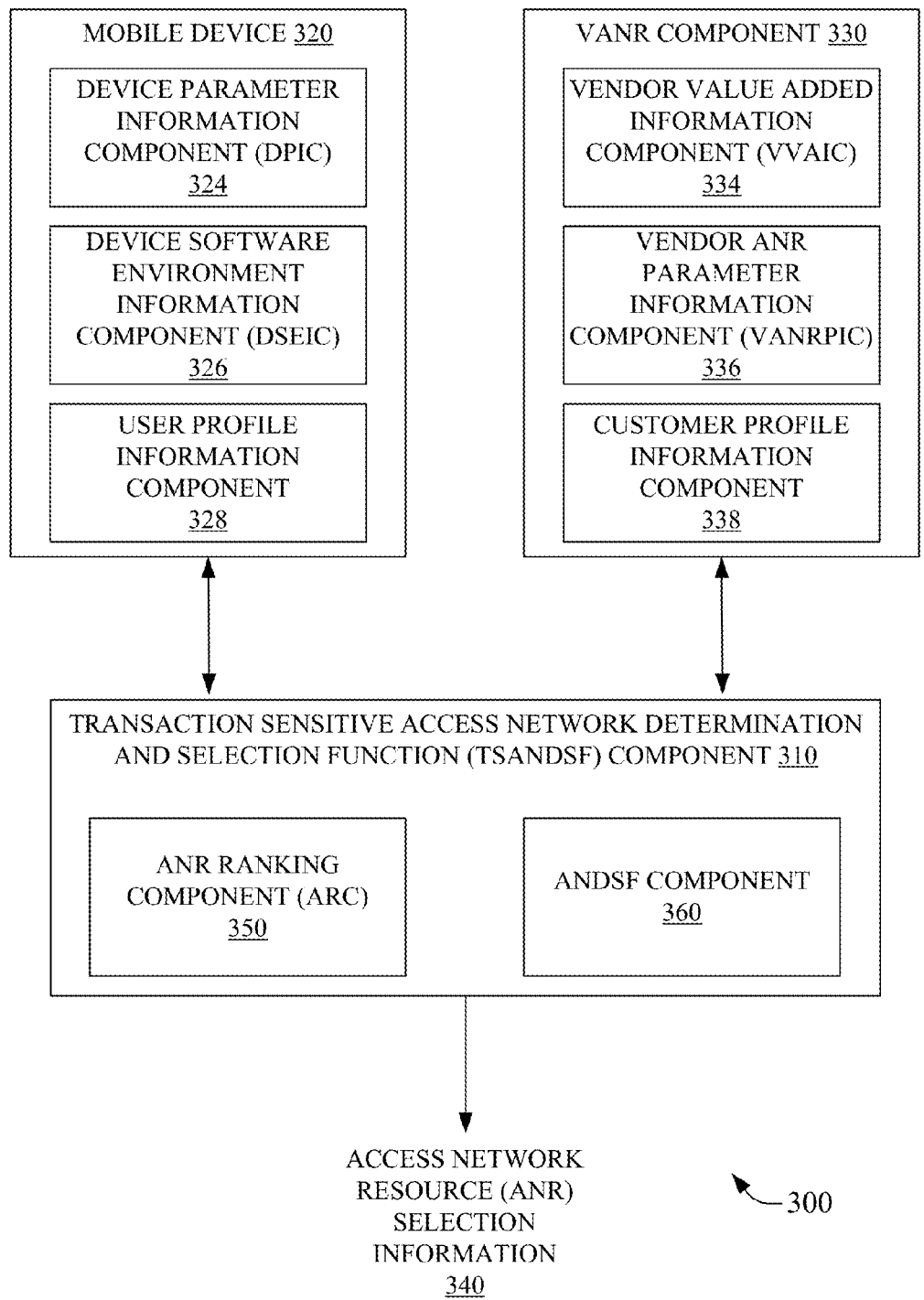
FIG. 3 illustrates a system that facilitates determining transaction sensitive ANDSF information based on information received via a vendor access network resource component and facilitating updating of a customer profile in accordance with aspects of the subject disclosure.

FIG. 3 illustrates a system 300 that facilitates determining transaction sensitive ANDSF information based on information received via a vendor access network resource component and facilitating updating of a customer profile in accordance with aspects of the subject disclosure. System 300 can include transaction sensitive ANDSF (TSANDSF) component 310. TSANDSF component 310 can be coupled to mobile device 320. Mobile device 320 can be a user equipment, such as, a smartphone, a cellphone, a tablet computer, a wearable device, a laptop computer, etc. Mobile device 320 can receive ANR selection information 340 to enable selection of an ANR based on TSANDSF analysis. Information related to mobile device 320 can comprise device hardware environment information or device software environment information related to a UE, a user or user profile associated with a UE, information about processes of a UE, or other information related to a UE or user.

Mobile device 320 can comprise device parameter information component (DPIC) 324. DPIC 324 can facilitate access to device parameter information. Device parameter information can comprise device hardware environment information. As such, device parameter information can comprise information related to processor speeds, memory characteristics, display parameters, accelerometer measurements, barometric measurements, temperature measurements, location, motion, user interface features, radio technologies of the device, battery levels and health, etc. In an aspect, DPIC 324 can facilitate access to nearly any information related to the physical state, environment, or feature of a UE to facilitate TSANDSF functionality in determining ANR selection information 340.

In some embodiments of system 300, mobile device 320 can comprise user profile information component 328. User profile information component 328 can facilitate access to information associated with a user profile. In some instances, user profile information component 328 can comprise a memory for storing a user profile. In some embodiments, user profile information component 328 can receive information from a user profile stored on another component. User profile information can comprise information related to user related preferences, user related facts, and use and user related opinions. User profile information can be considered in a TSANDSF analysis relating to selection of an ANR. As an example, user profile information component 328 can facilitate receiving information indicating that a user has a preference for a brand of clothing. This clothing brand preference can be shared with TSANDSF component 310 and considered in ANR ranking via ARC 350 in view of VVAIC 334 related information. Where VVAIC 334 related information indicates that the preferred clothing brand is associated with an ANR, this can increase the ranking of said ANR. As such, where the UE is establishes a link with said ANR, information, advertisements, discounts, etc., for example, those related to the brand of clothing, those related to complimentary products, services, and experiences, etc., can be relayed by the vendor to the user via the UE.

TSANDSF component 310 can be coupled to vendor access network resource (VANR) component 330. VANR component 330 can facilitate access to vendor value added information via vendor value added information component (VVAIC) 334 or vendor ANR parameter information, via vendor ANR parameter information component (VANRPIC) 336. VANRPIC 336 can facilitate access to ANR parameter information, such as, radio technology information, ANR software characteristics or parameters, ANR utilization information, ANR connectivity information, etc. VANRPIC 336, in an aspect, can enable access to information related to the environment of, operation of, or features of the vendor ANR.

VVAIC 334 can facilitate access to vendor value added information related to a vendor access network resource, a vendor service or product related thereto, account information related to an a UE or user profile, etc. VVAIC 334 can enable access to information relating to additional benefits associated with selecting a vendor ANR. As such, VVAIC 334 can provide for access to information that, for example, a vendor ANR employs strong encryption, a vendor complies with high levels of privacy, a vendor offers free or discounted products to users of the vendor's ANR, that a vendor ANR guarantees a level of latency/bandwidth/jitter/ etc., that a vendor ANR employs a designated communications standard, that a vendor location associated with the vendor's ANR has services or products available, etc.

VANR component 330 can also comprise customer profile information component 338. Customer profile information component 338 can facilitate access to information associated with a customer profile. In some instances, customer profile information component 338 can comprise a memory for storing a customer profile. In some embodiments, customer profile information component 338 can receive information from a customer profile stored on another component. Customer profile information can comprise information related to customer related preferences, customer related facts, and use and customer related opinions. Customer profile information can be considered in a TSANDSF analysis relating to selection of an ANR. As an example, customer profile information component 338 can facilitate receiving information indicating that a customer has a preference for a style of music. This music preference can be shared with TSANDSF component 310 and considered in ANR ranking via ARC 350 in view of related information received from mobile device 320, e.g., via user profile information component 328. Where information related to mobile device 320 indicates that the preferred music style is associated with an ANR, this can increase the ranking of said ANR. As such, where a UE is establishes a link with said ANR, information, advertisements, discounts, etc., for example, those related to the style of music, those related to complimentary products, services, and experiences, etc., can be relayed by the vendor to the user via the UE.

In some embodiments, user profile information component 328 and customer profile information component 328 can share information, either directly, via TSANDSF component 310, or via another pathway. In certain embodiments, user profile information component 328 and customer profile information component 328 can access information from the same data store. In other embodiments, user profile information component 328 can update information associated with customer profile information component 328. In some embodiments, customer profile information component 328 can update information associated with user profile information component 328. As such, user profile information component 328 and customer profile information component 328 can be updated to reflect information related to user preferences and customer preferences. As an example, a user can indicate a preference for a brand of coffee, which information can be populated into a customer profile for vendors of the same brand of coffee, other brands of coffee, of complimentary products, etc. As another example, a customer profile can reflect buying trends for customers, which information can be populated into a user profile even where the user isn't capable of determining the buying trends themselves. This trend information can then be shared with other vendor customer profile information components 338 to propagate information that can be effective in helping increase the rank of affiliated ANRs. As an example, where the user usually buys organic milk with non-organic eggs, this information can be determined by customer profile component 338 and shared with user profile information component 328. Further, the example information can then be shared with other customer profile information components to aid in determining a heist ranked ANR as relates to eggs and milk, such as offering a vendor discount on organic eggs when the UE links to a grocers ANR and scans in a bar code from an organic milk container, in an attempt to have the customer/user try organic eggs rather than regular eggs.

TSANDSF component 310 can facilitate determining ANR selection information 340. ANR selection information 340 can comprise information related to an ANR or a set of ANRs. The information can relate to ordered, filtered, or sorted ANRs, and reflect a suggested or prioritized ANR in accord with TSANDSF functionality. ANR selection information 340 can be based on information received via VANR component 330, which can comprise current or historical information from VVAIC 334, VANRPIC 336, or customer profile information component 338. ANR selection information 340 can also be based on current or historical information related to mobile device 320, e.g., received via DPIC 324, DSEIC 326, or user profile information component 328.

DPIC 324, DSEIC 326, or user profile information component 328 can enable access to mobile device information that can comprise, in certain embodiments, current UE device states to enable determining ANR selection information 340. Current UE device states can include information about the current hardware and current software environments of the UE. This current information can reflect a resource need or resource preference sought from an prospective ANR, and selection of an appropriate ANR can be facilitated by analyzing resources associated with equipment of different vendors.

In some embodiments, DPIC 324, DSEIC 326, or user profile information component 328 can enable access to historical UE device states as part of determining ANR selection information. Historical UE device states can include information about the historical hardware and historical software environments of the UE. This historical information can reflect a resource need or resource preference that can be met by an ANR, and selection of an appropriate ANR can be facilitated by analyzing resources associated with ANR devices of different vendors.

Some embodiments of DPIC 324, DSEIC 326, or user profile information component 328 can facilitate access to predicted UE device states, such as, inferences relating to likely future UE states, in conjunction with determining ANR selection information. Predicted UE device states can include information about likely future hardware and likely future software environment characteristics of a UE. This inference information can reflect a predicted resource need or resource preference that can be satisfied by an ANR, and selection of an appropriate ANR can be facilitated by analyzing resources associated with ANR devices of different vendors.

Certain embodiments of the present disclosure provide for DPIC 324, DSEIC 326, user profile information component 328, VVAIC 334, or customer profile information component 338, to enable access to event information to facilitate determining ANR selection information. As such, UE device information or vendor information can comprise event information. This event information can reflect a resource need or resource preference that can be satisfied by an ANR, and selection of an appropriate ANR can be facilitated by analyzing resources associated with ANR devices of different vendors. Event information can be employed to suggest that the UE establish a link to an ANR to capture added value corresponding to an event via a vendor or vendor ANR.

TSANDSF component 310 can further rank or order vendor ANRs, conventional ANDSF information, or a combination thereof. As such, TSANDSF component 310 can comprise ANR ranking component (ARC) 350. ARC 350 can analyze information received from mobile device 320 or VANR component 330 to rank a vendor ANR. Moreover, in some embodiments, ANDSF component 360 can enable access to conventional ANDSF information. Where conventional ANDSF information is received, ARC component 350 can also facilitate ranking this information. As sated herein, ranking ANRs associated with conventional ANDSF information can be separate from, in parallel with, or in conjunction with ranking of a vendor ANR.

Figure 4:
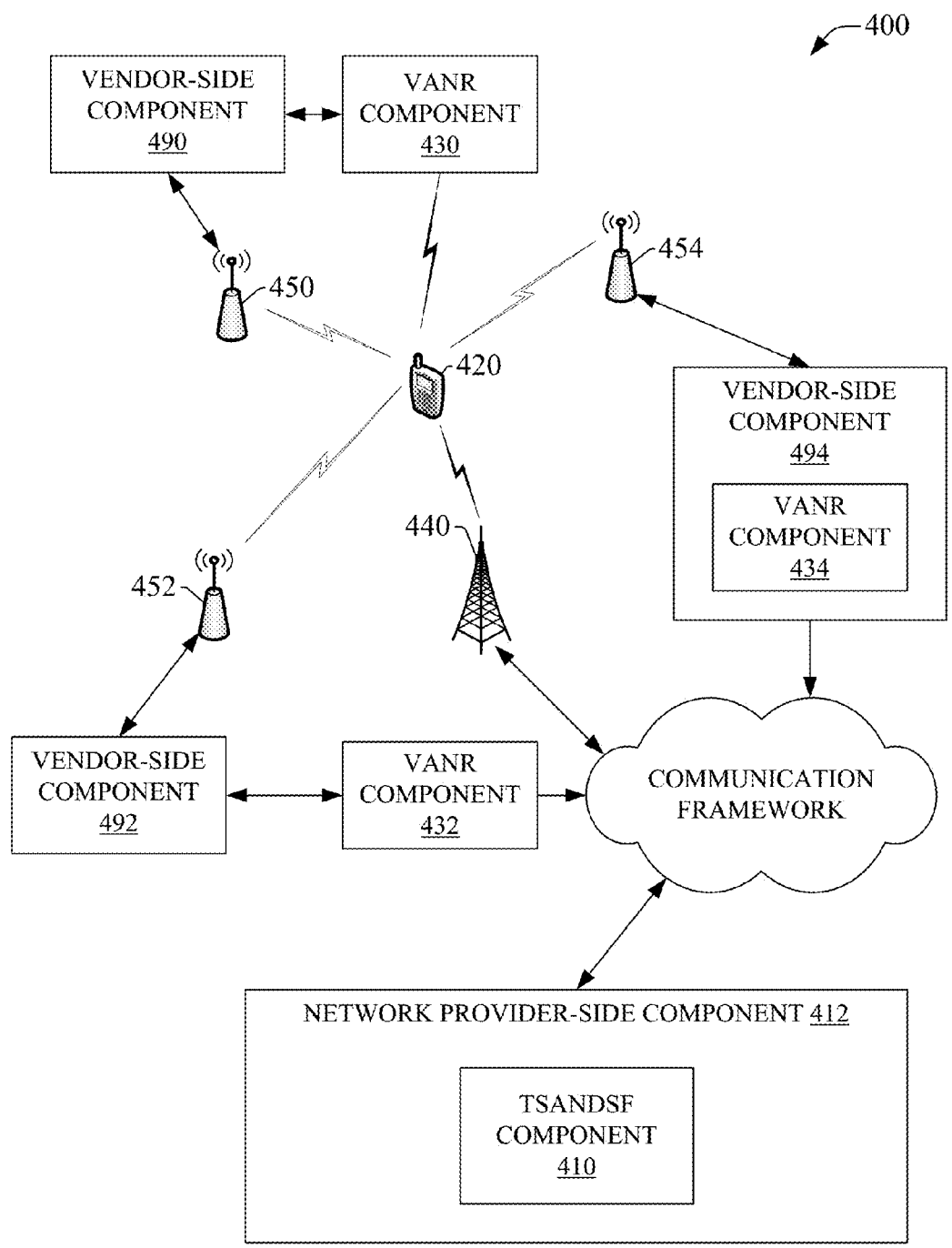
FIG. 4 illustrates an example system that facilitates transaction sensitive ANDSF functionality via a transaction sensitive ANDSF component located at a device located in a network provider-side component in accordance with aspects of the subject disclosure.

FIG. 4 illustrates example system 400 that facilitates transaction sensitive ANDSF functionality via a transaction sensitive ANDSF component located at a device located in a network provider-side component in accordance with aspects of the subject disclosure. System 400 can include transaction sensitive ANDSF component 410 located at a network provider-side component 412 which can be linked to UE 420 via a communication framework and radio device 440. UE 420 can be linked to radio device 440 wirelessly, e.g., by a cellular connection, etc. UE 420 can receive ANR selection information ranking ANR 450, 452, 454, etc., to enable UE 420 in selecting and establishing a link with said ANRs where determined to be appropriate. Moreover, system 400 can illustrate several configurations implementing VANR components, e.g., VANR component 430, 432, and 434. VANR components 430, 432, and 434, can facilitate TSANDSF analysis of ANRs 450, 452, 454, etc., as part of determining ANR selection information.

ANR 450 can be associated with vendor-side component 490, such as a vendor router, vendor server, etc. ANR 450 can be coupled to VANR component 430 via vendor-side component 490. VANR component 430 can source information to TSANDSF component 410 via wireless link to UE 420. UE 420 can source information to TSANDSF component 410, comprising device information and VANR information, via radio device 440 and the communication framework. This information can be employed in determining ANR selection information.

ANR 452 can be associated with vendor-side component 492. ANR 452 can be coupled to VANR component 432 via vendor-side component 492. In some embodiments, VANR component 432 can be located on the vendor side of the communications framework. In certain embodiments, VANR component 432 can be located remote from vendor-side component 492 and remote from network provider-side component 412. In other embodiments, VANR component 432 can be located on the network provider-side of the communications framework (not illustrated). VANR component 432 can source information to TSANDSF component 410 via a link to network provider-side component 412 via the communications framework. UE 420 can source information to TSANDSF component 410 via radio device 440 and the communication framework. This information can be employed in determining ANR selection information.

ANR 454 can be associated with vendor-side component 494. ANR 454 can be coupled to vendor-side component 494, which can comprise VANR component 434. In some embodiments, vendor-side component 494 can be located near ANR 454. In certain embodiments, vendor-side component 494 can be located remotely from ANR 454. VANR component 434 can source information to TSANDSF component 410 via a link to network provider-side component 412 via the communications framework. UE 420 can source information to TSANDSF component 410 via radio device 440 and the communication framework. This information can be employed in determining ANR selection information.

TSANDSF component 410 can determine ranking information for ANR 450, 452, and 454, based on device information from UE 420 and VANR information from VANR component 430, 432, and 434. Ranking information for ANR 450, 452, and 454, can further be based on conventional ANDSF information (not illustrated) received by TSANDSF component 410 as discussed herein. The ranking information can be employed in determining ANR selection information that can be received by UE 420. This ANR selection information can enable UE 420 to establish a link with ANR 450, 452, or 454 that reflects vendor value added aspects, device related information, and user related information as disclosed herein.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
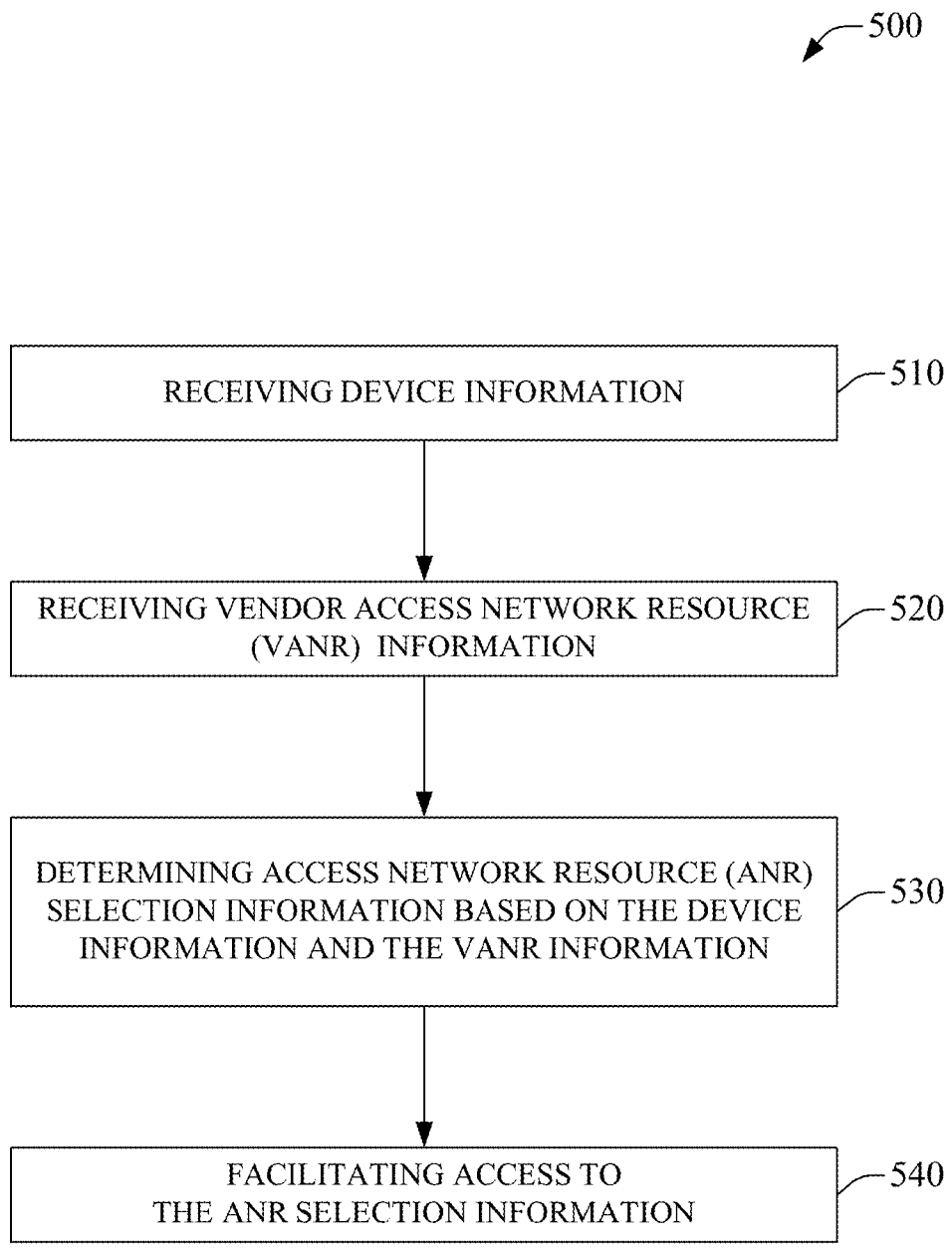
FIG. 5 illustrates a method that facilitates access to access network resource selection information based on determining transaction sensitive ANDSF information in accordance with aspects of the subject disclosure.

FIG. 5 illustrates a method 500 that facilitates accessing access network resource selection information based on determining transaction sensitive ANDSF information. At 510, method 500 can include receiving device information. Device information can comprise device hardware environment information or device software environment information related to a UE, a user or user profile associated with the UE, information about processes of the UE, or other information related to the UE or user. In an aspect, device information can comprise an identifier, location information, motion information, time information, predicted location information, schedule information, an encryption key, financial information, billing information, information related to a process in execution on the UE, QoE or QoS information, service tier information, user preferences, security information, privacy information, device hardware information, device software information, a behavior model, access network resource information, etc. In certain embodiments, device information can comprise current, historical, predictive, or event information as disclosed herein.

At 520, method 500 can comprise receiving vendor access network resource (VANR) information. VANR information can comprise vendor value added information or vendor access network resource (ANR) parameter information related to an access network resource, related to a vendor service or product related thereto, account information related to an a UE or user profile, etc. In some embodiments, VANR information can comprise event information, as disclosed herein. In certain embodiments, VANR information can comprise current or historical vendor ANR information, such as, ANR network congestion, available ANRs, billing agreements for ANRs with a network provider, vendor-centric selection rules, etc.

At 530, method 500 can comprise determining ANR selection information based on the device information and VANR information. Determining ANR selection information can comprise analysis of information related to an ANR or a set of ANRs. The information can relate to ordered, filtered, or sorted ANRs, and reflect a suggested or prioritized ANR in accord with TSANDSF functionality. ANR selection information can be based on VANR information, which can comprise current or historical vendor ANR information. ANR selection information can also be based on mobile device information. Determining ANR selection information can also comprise ranking or ordering an ANR. In some instances, ranking or ordering an ANR can comprise ranking or ordering a vendor ANR. Ranking or ordering an ANR can further be based on receiving conventional ANDSF information, as disclosed elsewhere herein, such as ANDSF information received from a core network component associated with a cellular service provider core network. As such, a TSANDSF component can extend functionality associated with conventional ANDSF technology. In an embodiment, a TSANDSF component can function in parallel with conventional ANDSF components to provide increased functionality for a UE proximate to an ANR associated with VANR information. As such, in some embodiments, a conventional ANDSF component can provide selection information that is ignorant of VANR information to some UEs and a TSANDSF component can contemporaneously provide ANR selection information to a UE that is based on VANR information and further based on conventional ANDSF information.

At 540, method 500 can include facilitating access to the ANR selection information. At this point method 500 can end. In some embodiments, access to the ANR selection information can be by a UE, such as the device associated with device information from 510.

Device information can comprise, in certain embodiments, current UE device states to enable determining ANR selection information. Current UE device states can include information about the current hardware and current software environments of the UE. This current information can reflect a resource need or resource preference sought from an prospective ANR, and selection of an appropriate ANR can be facilitated by analyzing resources associated with equipment of different vendors.

In some embodiments, transaction sensitive ANDSF technology, can employ historical UE device states, e.g., as part or device information, in determining ANR selection information. Historical UE device states can include information about the historical hardware and historical software environments of the UE. This historical information can reflect a resource need or resource preference that can be met by an ANR, and selection of an appropriate ANR can be facilitated by analyzing resources associated with ANR devices of different vendors.

Some embodiments of device information can comprise predicted UE device states, e.g., inferences on likely future UE states, in determining ANR selection information. Predicted UE device states can include information about likely future hardware and likely future software environment characteristics of a UE. This inference information can reflect a resource need or resource preference that can be satisfied by an ANR, and selection of an appropriate ANR can be facilitated by analyzing resources associated with ANR devices of different vendors.

Certain embodiments of the present disclosure provide transaction sensitive ANDSF technology that can employ event information, in determining ANR selection information. Device information or VANR information can include event information. This event information can reflect a resource need or resource preference that can be satisfied by an ANR, and selection of an appropriate ANR can be facilitated by analyzing resources associated with ANR devices of different vendors. The event information can be employed to suggest that the UE establish a link to an ANR to capture the added value.

Figure 6:
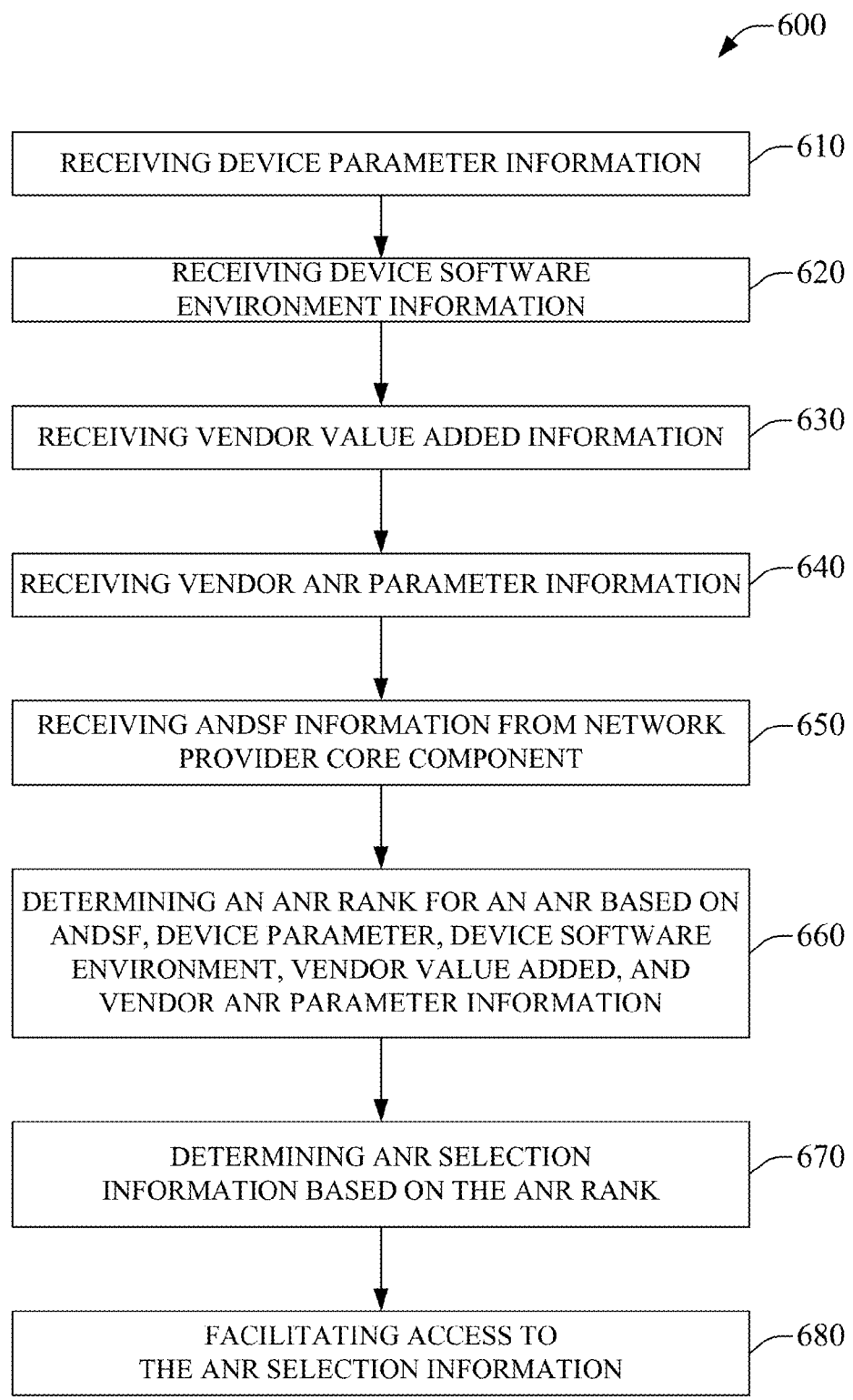
FIG. 6 illustrates a method that facilitates determining transaction sensitive ANDSF information based on device parameter information, device software environment information, vendor value added information, and vendor access network resource information in accordance with aspects of the subject disclosure.

FIG. 6 illustrates a method 600 that facilitates determining transaction sensitive ANDSF information based on device parameter information, device software environment information, vendor value added information, and vendor access network resource information. At 610, method 600 can include receiving device parameter information. Device parameter information can comprise device hardware environment information. As such, device parameter information can comprise information related to processor speeds, memory characteristics, display parameters, accelerometer measurements, barometric measurements, temperature measurements, location, motion, user interface features, radio technologies of the device, battery levels and health, etc. In an aspect, device parameter information can comprise nearly any information related to the physical state, environment, or feature of a UE to facilitate TSANDSF functionality in determining ANR selection information. In certain embodiments, device parameter information can comprise current, historical, predictive, or event information as disclosed herein.

At 620, method 600 can comprise receiving device software environment information. Device software environment information can comprise information related to processes in execution, active processes, inactive processes, stalled processes, connectivity requirements or preferences, memory access characteristics, user interface parameters, software versions, update status, etc. In an aspect, this can facilitate access to nearly any information related to the software state, software environment, or software features of a UE to facilitate TSANDSF functionality in determining ANR selection information. In certain embodiments, device parameter information can comprise current, historical, predictive, or event information as disclosed herein.

At 630, method 600 can comprise receiving vendor value added information. This information can be related to a vendor access network resource, a vendor service or product related thereto, account information related to an a UE or user profile, etc. In some embodiments, vendor value added information can be related to additional benefits associated with selecting a vendor ANR. As such, vendor value added information can indicate, for example, a vendor ANR employs strong encryption, a vendor complies with high levels of privacy, a vendor offers free or discounted products to users of the vendor's ANR, that a vendor ANR guarantees a level of latency/bandwidth/jitter/etc., that a vendor ANR employs a designated communications standard, that a vendor location associated with the vendor's ANR has services or products available, etc.

At 640, method 600 can comprise receiving vendor ANR parameter information. Vendor ANR parameter information can comprise radio technology information, ANR software characteristics or parameters, ANR utilization information, ANR connectivity information, etc. In an aspect, vendor ANR parameter information can be related to the environment of, operation of, or features of the vendor ANR.

At 650, method 600 can comprise receiving ANDSF information from a network provider component. In some instance, the network provider component can be a network provider core component, e.g., can be a component located in the core systems associated with the network provider. In other instances, the network provider component can be a non-core component, such as, a NodeB, eNodeB, edge server, etc. In some embodiments, ANDSF information from a network provider component can be conventional ANDSF information, which can facilitate ranking ANRs associated with conventional ANDSF information separate from, in parallel with, or in conjunction with ranking of a vendor ANR, as disclosed herein.

At 660, method 600 can comprise determining an ANR rank for an ANR based on ANDSF information, device parameter information, device software environment information, vendor value added information, and vendor ANR parameter information. Determining rank can further comprise ranking or ordering vendor ANRs, ranking or ordering ANRs based on conventional ANDSF information, or a combination thereof. This can comprise an analysis of information received from a mobile device, e.g., device parameter information or device software environment information, or VANR component, e.g., vendor value added information or vendor ANR parameter information, to rank a vendor ANR. Moreover, in some embodiments, access to conventional ANDSF information, e.g., from a conventional ANDSF component located elsewhere can also facilitate ranking non-vendor ANRs associated with this conventional information. As sated herein, ranking ANRs associated with conventional ANDSF information can be separate from, in parallel with, or in conjunction with ranking of a vendor ANR.

At 670, method 600 can comprise determining ANR selection information based on the ANR rank information from 660. Determining ANR selection information can comprise analysis of information related to an ANR or a set of ANRs in view of the rank determination for an ANR.

At 680, method 600 can include facilitating access to the ANR selection information. At this point method 600 can end. In some embodiments, access to the ANR selection information can be by a UE, such as the device associated with device information from 610.

Figure 7:
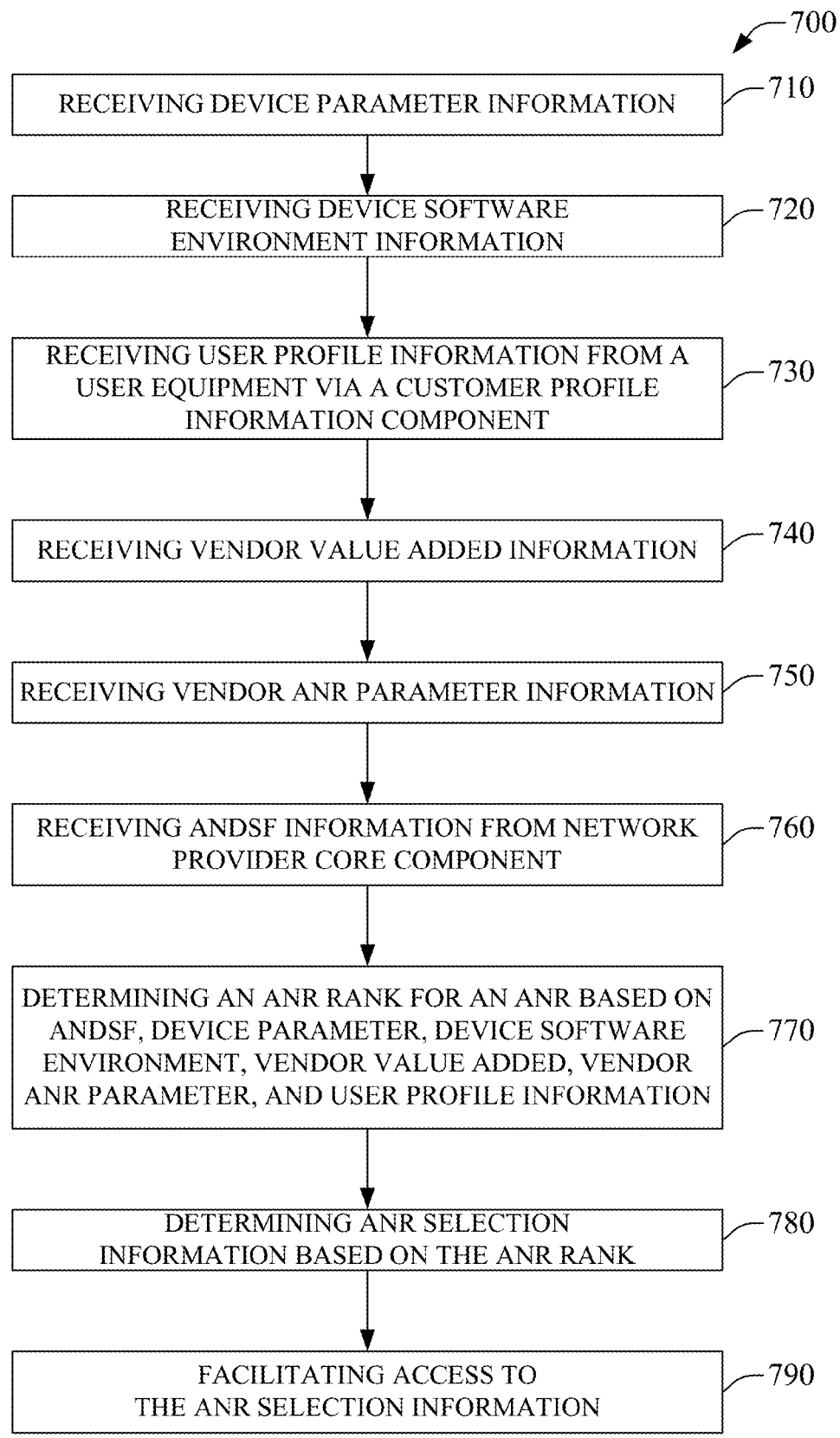
FIG. 7 depicts a method facilitating determining transaction sensitive ANDSF information based on user profile information, from a UE, received via a customer profile information component of a vendor access network resource component in accordance with aspects of the subject disclosure.

FIG. 7 illustrates a method 700 that facilitates determining transaction sensitive ANDSF information based on user profile information, from a UE, received via a customer profile information component of a vendor access network resource component in accordance with aspects of the subject disclosure. At 710, method 700 can include receiving device parameter information. Device parameter information can comprise device hardware environment information. As such, device parameter information can comprise information related to processor speeds, memory characteristics, display parameters, accelerometer measurements, barometric measurements, temperature measurements, location, motion, user interface features, radio technologies of the device, battery levels and health, etc. In an aspect, device parameter information can comprise nearly any information related to the physical state, environment, or feature of a UE to facilitate TSANDSF functionality in determining ANR selection information. In certain embodiments, device parameter information can comprise current, historical, predictive, or event information as disclosed herein.

At 720, method 700 can comprise receiving device software environment information. Device software environment information can comprise information related to processes in execution, active processes, inactive processes, stalled processes, connectivity requirements or preferences, memory access characteristics, user interface parameters, software versions, update status, etc. In an aspect, this can facilitate access to nearly any information related to the software state, software environment, or software features of a UE to facilitate TSANDSF functionality in determining ANR selection information. In certain embodiments, device parameter information can comprise current, historical, predictive, or event information as disclosed herein.

At 730, method 700 can comprise receiving user profile information. User profile information can, in an embodiment, be received from a user equipment via a customer profile information component. User profile information can comprise information related to user related preferences, user related facts, and use and user related opinions. User profile information can be considered in a TSANDSF analysis relating to selection of an ANR. A customer profile information component can facilitate access to information associated with a customer profile. Customer profile information can comprise information related to customer related preferences, customer related facts, and use and customer related opinions. Customer profile information can be considered in a TSANDSF analysis relating to selection of an ANR. User profile information and customer profile information can, in some instances, comprise the same or similar information, for example where the information is shared either directly, via a TSANDSF component, or via another pathway. In certain embodiments, user profile information and customer profile information can be stored on the same data store or can be in extracted from the same set of data. In an aspect, a customer profile information component can facilitate access to user profile information.

In some embodiments, user profile information can be used to update customer profile information. In some embodiments, customer profile information can be used to update user profile information. As such, user profile information and customer profile information can be updated to reflect information related to user preferences and customer preferences.

At 740, method 700 can comprise receiving vendor value added information. This information can be related to a vendor access network resource, a vendor service or product related thereto, account information related to an a UE or user profile, etc. In some embodiments, vendor value added information can be related to additional benefits associated with selecting a vendor ANR. As such, vendor value added information can indicate, for example, a vendor ANR employs strong encryption, a vendor complies with high levels of privacy, a vendor offers free or discounted products to users of the vendor's ANR, that a vendor ANR guarantees a level of latency/bandwidth/jitter/etc., that a vendor ANR employs a designated communications standard, that a vendor location associated with the vendor's ANR has services or products available, etc.

At 750, method 700 can comprise receiving vendor ANR parameter information. Vendor ANR parameter information can comprise radio technology information, ANR software characteristics or parameters, ANR utilization information, ANR connectivity information, etc. In an aspect, vendor ANR parameter information can be related to the environment of, operation of, or features of the vendor ANR.

At 760, method 700 can comprise receiving ANDSF information from a network provider component. In some instance, the network provider component can be a network provider core component, e.g., can be a component located in the core systems associated with the network provider. In other instances, the network provider component can be a non-core component, such as, a NodeB, eNodeB, edge server, etc. In some embodiments, ANDSF information from a network provider component can be conventional ANDSF information, which can facilitate ranking ANRs associated with conventional ANDSF information separate from, in parallel with, or in conjunction with ranking of a vendor ANR, as disclosed herein.

At 770, method 700 can comprise determining an ANR rank for an ANR based on ANDSF information, device parameter information, device software environment information, vendor value added information, vendor ANR parameter information, and user profile information. Determining rank can further comprise ranking or ordering vendor ANRs, ranking or ordering ANRs based on conventional ANDSF information, or a combination thereof. This can comprise an analysis of information received from a mobile device, e.g., device parameter information or device software environment information, or VANR component, e.g., vendor value added information or vendor ANR parameter information, to rank a vendor ANR. Moreover, in some embodiments, access to conventional ANDSF information, e.g., from a conventional ANDSF component located elsewhere can also facilitate ranking non-vendor ANRs associated with this conventional information. As sated herein, ranking ANRs associated with conventional ANDSF information can be separate from, in parallel with, or in conjunction with ranking of a vendor ANR.

At 780, method 700 can comprise determining ANR selection information based on the ANR rank information from 760. Determining ANR selection information can comprise analysis of information related to an ANR or a set of ANRs in view of the rank determination for an ANR.

At 790, method 700 can include facilitating access to the ANR selection information. At this point method 700 can end. In some embodiments, access to the ANR selection information can be by a UE, such as the device associated with device information from 710.

Figure 8:
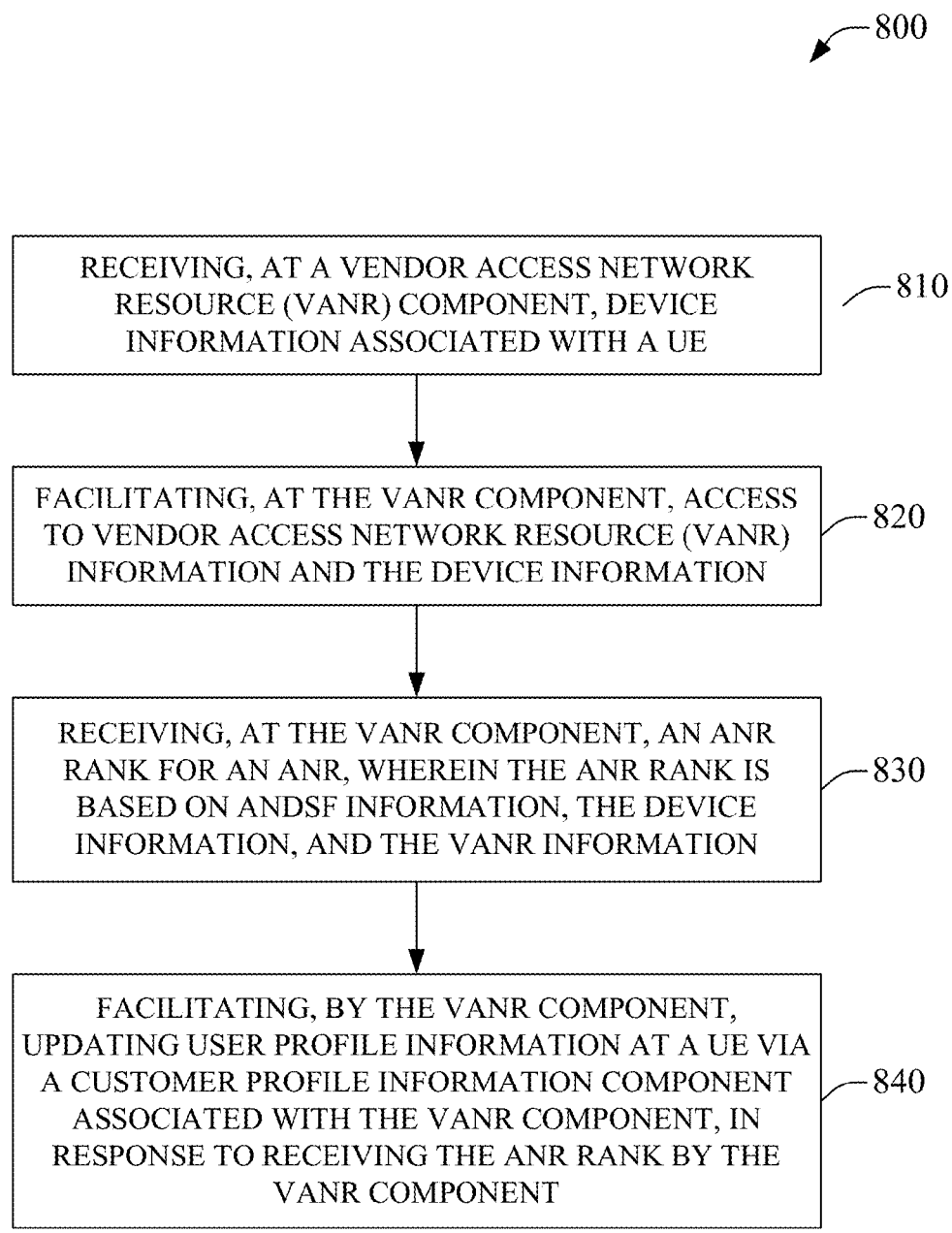
FIG. 8 illustrates a method facilitating updating user profile information at a UE, via a vendor access network resource component, in response to receiving an access network resource rank by the vendor access network resource component in accordance with aspects of the subject disclosure.

FIG. 8 illustrates a method 800 that facilitates updating user profile information at a UE, via a vendor access network resource component, in response to receiving an access network resource rank by the vendor access network resource component in accordance with aspects of the subject disclosure. At 810, method 800 can include receiving device information associated with a UE. The information can be received at a vendor access network resource component. Device information can comprise, in certain embodiments, current UE device states to enable determining ANR selection information. Current UE device states can include information about the current hardware and current software environments of the UE. This current information can reflect a resource need or resource preference sought from a prospective ANR, and selection of an appropriate ANR can be facilitated by analyzing resources associated with equipment of different vendors. In some embodiments, device information can comprise historic information, future information, or event information, as disclosed herein.

At 820, method 800 can include facilitating access to VANR information. The access can be facilitated by the vendor access network resource component. VANR information can comprise vendor value added information or vendor ANR parameter information related to an access network resource, related to a vendor service or product related thereto, account information related to an a UE or user profile, etc. In some embodiments, VANR information can comprise event information, as disclosed herein. In certain embodiments, VANR information can comprise current or historical vendor ANR information, such as, ANR network congestion, available ANRs, billing agreements for ANRs with a network provider, vendor-centric selection rules, etc. The device information can also be accessed at 820.

At 830, method 800 can include receiving, at the VANR component, an ANR rank for an ANR, wherein the ANR rank is based on ANDSF information, the device information, and the VANR information. Determining an ANR rank can comprise analysis of information related to an ANR or a set of ANRs. The information can reflect a suggested or prioritized ANR in accord with TSANDSF functionality. ANR selection information can be based on VANR information, which can comprise current or historical vendor ANR information. ANR selection information can also be based on device information. In some instances, ranking or ordering an ANR can comprise ranking or ordering a vendor ANR. Ranking or ordering an ANR can further be based on receiving conventional ANDSF information, as disclosed elsewhere herein, such as ANDSF information received from a core network component associated with a cellular service provider core network.

At 840, method 800 can comprise the VANR component facilitating updating user profile information at a UE via a customer profile information component associated with the VANR component. This can be in response to receiving, at the ANR rank by the VANR component. At this point, method 800 can end. User profile information can comprise information related to user related preferences, user related facts, and use and user related opinions. User profile information can be considered in a TSANDSF analysis relating to selection of an ANR. A customer profile information component can facilitate access to information associated with a customer profile. Customer profile information can comprise information related to customer related preferences, customer related facts, and use and customer related opinions. Customer profile information can be considered in a TSANDSF analysis relating to selection of an ANR. User profile information and customer profile information can, in some instances, comprise the same or similar information, for example where the information is shared either directly, via a TSANDSF component, or via another pathway. In certain embodiments, user profile information and customer profile information can be stored on the same data store or can be in extracted from the same set of data. In an aspect, a customer profile information component, e.g., customer profile information component 338, can facilitate access to user profile information. In some embodiments, user profile information can be used to update customer profile information. In some embodiments, customer profile information can be used to update user profile information. As such, user profile information and customer profile information can be updated to reflect information related to user preferences and customer preferences.

Figure 9:
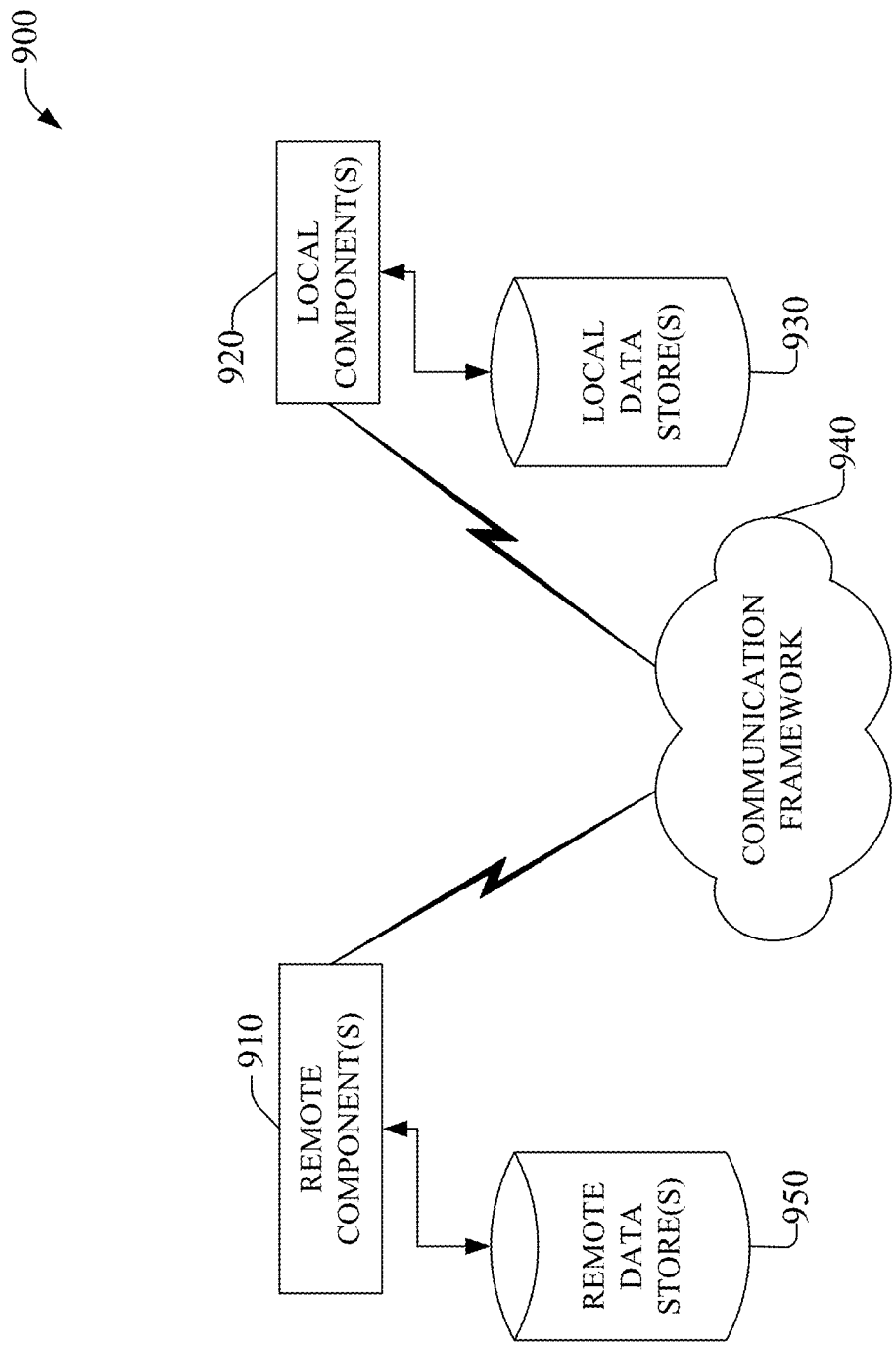
FIG. 9 depicts a schematic block diagram of a computing environment with which the disclosed subject matter can interact.

FIG. 9 is a schematic block diagram of a computing environment 900 with which the disclosed subject matter can interact. The system 900 includes one or more remote component(s) 910. The remote component(s) 910 can be hardware and/or software (e.g., threads, processes, computing devices). In some embodiments, remote component(s) 910 can include servers, personal servers, wireless telecommunication network devices, etc. As an example, remote component(s) 910 can be a mobile device, e.g., mobile device 220, 320, 420, etc., a VANR component, e.g., VANR component 230, 330, 430, 432, 434, etc., a vendor-side component, e.g., 490, 492, 494, etc., an ANR, e.g., 450-452, 454, etc.

The system 900 also includes one or more local component(s) 920. The local component(s) 920 can be hardware and/or software (e.g., threads, processes, computing devices). In some embodiments, local component(s) 920 can include a TSANDSF component, e.g., TSANDSF component 110, 210, 310, 410, etc., a network provider side component 412, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. As an example, information related to a device hardware or software environment, vendor ANR parameters, vendor value added information, ANR selection information, ANDSF information, etc., can be communicated over a packet-switched or circuit-switched channels between remote component 910, and a local component 920, via an air interface, such as on a packet-switched or circuit-switched downlink channel. The system 900 includes a communication framework 940 that can be employed to facilitate communications between the remote component(s) 910 and the local component(s) 920, and can include an air interface, e.g., Uu interface of a UMTS network. Remote component(s) 910 can be operably connected to one or more remote data store(s) 950, such as an available user profile store, e.g., 328, customer profile store, e.g., 338, mobile device information store, VANR information store, etc., that can be employed to store information on the remote component(s) 910 side of communication framework 940. Similarly, local component(s) 920 can be operably connected to one or more local data store(s) 930, that can be employed to store information, such as received ANDSF information, received user profile information, e.g., 328, received customer profile information, e.g., 338, received mobile device information, received VANR information store, etc., on the local component(s) 920 side of communication framework 940.

Figure 10:
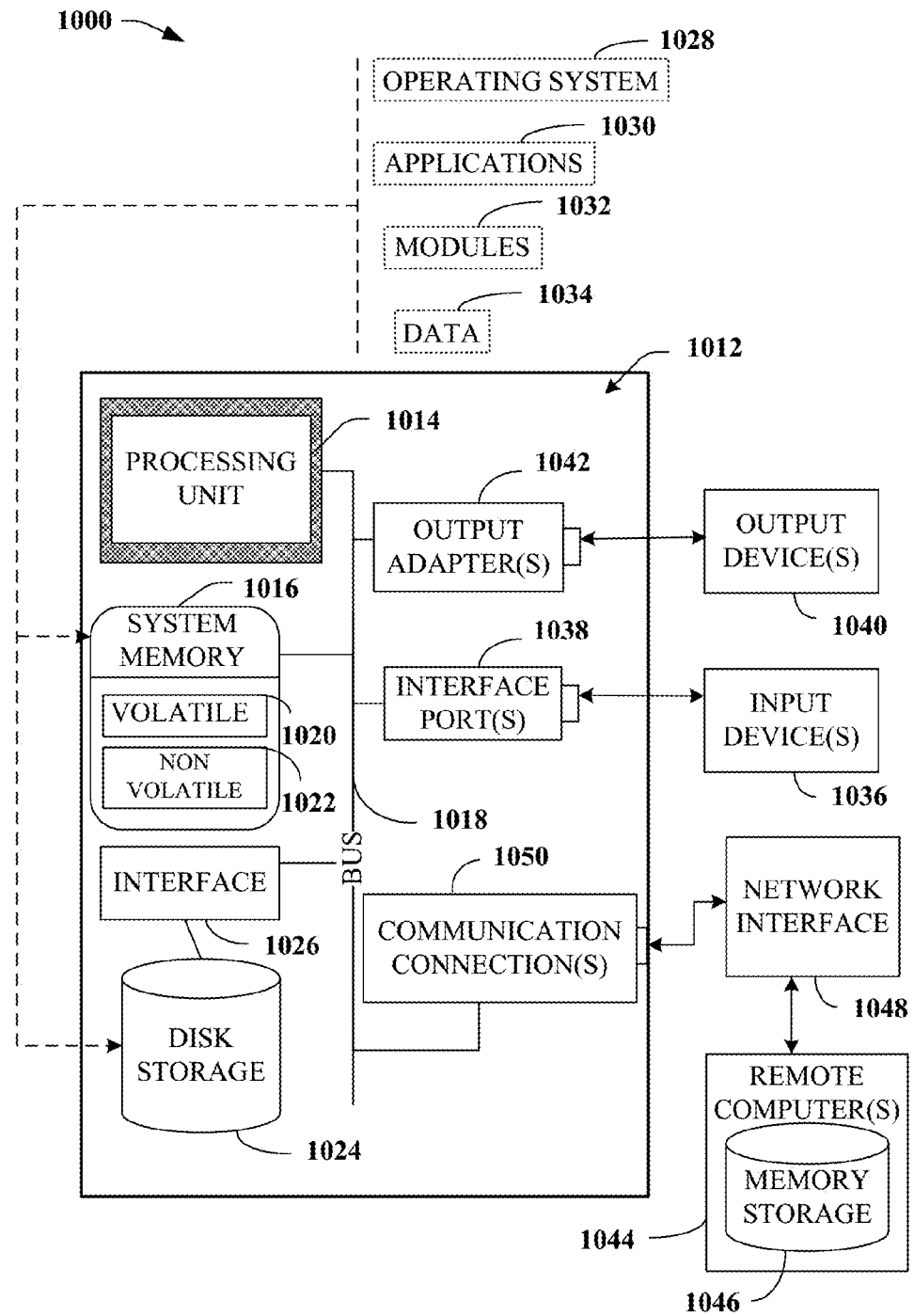
FIG. 10 illustrates a block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory"

or components comprising the memory. It is noted that the memory components described herein can be either volatile memory or nonvolatile memory, or can include both volatile and nonvolatile memory, by way of illustration, and not limitation, volatile memory 1020 (see below), non-volatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, including single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, part of TSANDSF component 110, 210, 310, 410, etc., mobile device 220, 320, 420, VANR component 230, 330, 430, 432, 434, 436, etc., or employing method 500, 600, 700 or 800, etc., includes a processing unit 1014, a system memory 1016, and a system bus 1018. System bus 1018 couples system components including, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) including a memory bus or a memory controller, a peripheral bus or an external bus, and/or a local bus using any variety of available bus architectures including, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can include volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can include read only memory, programmable read only memory, electrically programmable read only memory, electrically erasable read only memory, or flash memory. Volatile memory 1020 includes read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. As an example, a user interface can allow entry of user profile information, 328, etc., e.g., user preferences, user facts, etc., customer profile information, 338, etc., e.g., customer preferences, customer facts, etc., and can be embodied in a touch sensitive display panel, a mouse input GUI, a command line controlled interface, etc., allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 include, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1018. It should be noted that other devices and/or systems of devices provide both input and output capabilities such as remote computer(s) 1044. As an example, vehicle subsystems, such as headlights, brake lights, stereos, vehicle information sharing device, etc., can include an output adapter 1042 to enable use in accordance with the presently disclosed subject matter.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies include fiber distributed data interface, copper distributed data interface, Ethernet, Token Ring and the like. Wide area network technologies include, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and digital subscriber line modems, integrated services digital network adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc; femto-cell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising
a processor; and
a memory that stores executable instructions that, when executed by the processor, facilitate performance of operations, comprising:
in response to receiving an identifier, receiving information related to a user profile from a device associated with an access network discovery and selection function, wherein the information comprises an interest indicator, and wherein the information is associated with historical use information associated with the user profile;
determining a commerce provider value for a commerce provider wireless network device having a service area comprising a location of a mobile device associated with the user profile, wherein the commerce provider value is determined based on whether the commerce provider value satisfies a rule related to the interest indicator;
selecting the commerce provider wireless network device based on the commerce provider value; and
facilitating access to a commerce provider service feature via the mobile device connected to the commerce provider wireless network device.

2. The system of claim 1, wherein the interest indicator is associated with contemporary use information associated with the user profile.

3. The system of claim 1, wherein the historical use information associated with the user profile comprises historical preference information associated with a user identity.

4. The system of claim 1, wherein the interest indicator is associated with inferred information associated with the user profile related to an inference with respect to a future use of the mobile device.

5. The system of claim 1, wherein the interest indicator is associated with use information associated with the user profile and a determination of an event being determined to have occurred within a predetermined distance from the mobile device.

6. The system of claim 1, wherein the facilitating the access to the commerce provider service feature comprises access to an advertisement related to a commerce provider identity associated with the commerce provider wireless network device.

7. The system of claim 1, wherein the facilitating the access to the commerce provider service feature comprises access to a defined premium service tier provided by the commerce provider wireless network device of a commerce provider identity.

8. The system of claim 1, wherein the facilitating the access to the commerce provider service feature comprises facilitating access to an themed application interface related to a commerce provider identity associated with the commerce provider wireless network device.

9. A method comprising:
receiving, by a device comprising a processor, information comprising a state indicator related to a mobile device state, wherein the device is associated with an access network discovery and selection function, and wherein the state indicator is associated with historical use information associated with the mobile device;
determining, by the device, a commerce provider value for a commerce provider wireless network device having a service area comprising a location of the mobile device, wherein the commerce provider value is determined based on whether the commerce provider value satisfies a rule related to the state indicator;
selecting, by the device, the commerce provider wireless network device based on the commerce provider value; and
facilitating, by the device, access to a commerce provider service feature via the mobile device connected to the commerce provider wireless network device.

10. The method of claim 9, wherein the receiving the information comprises receiving the state indicator associated with contemporary use information associated with the mobile device.

11. The method of claim 9, wherein the historical use information associated with the mobile device comprises historical facts associated with a user identity.

12. The method of claim 9, wherein the receiving the information comprises receiving the state indicator associated with inferred information related to an inference with respect to a future use of the mobile device.

13. The method of claim 9, wherein the receiving the information comprises receiving the state indicator associated with use information associated with the mobile device and a determination of an event being determined to have occurred within a predetermined distance from the mobile device.

14. The method of claim 9, wherein the facilitating the access to the commerce provider service feature comprises access to information related to a commerce provider value added feature associated with the commerce provider.

15. The method of claim 14, wherein the access to information related to a commerce provider value added feature comprises access to information related to a discount offered by the commerce provider.

16. The method of claim 14, wherein the access to information related to a commerce provider value added feature comprises access to information related to a service offered by the commerce provider via the mobile device after connecting to the commerce provider wireless network device.

17. A machine-readable storage device comprising executable instructions that, when executed by a processor, facilitate performance of operations, comprising:
receiving information comprising an indicator related to a mobile device software environment condition, wherein the information comprises receiving a state indicator associated with historical use information associated with the mobile device;
determining a commerce provider value for a commerce provider wireless network device having a service area comprising a location of the mobile device, wherein the commerce provider value is determined based on whether the commerce provider value satisfies a rule related to the indicator;

selecting the commerce provider wireless network device based on the commerce provider value; and facilitating access to a commerce provider service feature via the mobile device connected to the commerce provider wireless network device.

18. The computer-readable storage device of claim 17, wherein the historical use information associated with the mobile device comprises historical opinions related to a user identity.

19. The computer-readable storage device of claim 17, wherein the receiving the information comprises receiving the state indicator associated with inferred information related to an inference with respect to a future use of the mobile device.

20. The computer-readable storage device of claim 17, wherein the facilitating the access to the commerce provider service feature comprises access to information related to a commerce provider value added feature associated with the commerce provider.

* * * * *